(12) United States Patent
Guedon et al.

(10) Patent No.: US 12,119,735 B2
(45) Date of Patent: Oct. 15, 2024

(54) HARDWARE AND METHODS FOR VOLTAGE AND CURRENT SENSING

(71) Applicant: STMicroelectronics Asia Pacific Pte Ltd, Singapore (SG)

(72) Inventors: Yannick Guedon, Singapore (SG); Teerasak Lee, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 315 days.

(21) Appl. No.: 17/680,666

(22) Filed: Feb. 25, 2022

(65) Prior Publication Data

US 2023/0275508 A1 Aug. 31, 2023

(51) Int. Cl.
*H02M 1/00* (2007.01)

(52) U.S. Cl.
CPC .................. *H02M 1/0009* (2021.05)

(58) Field of Classification Search
CPC ....... H02M 1/0009; H02M 3/07; H02M 3/158
See application file for complete search history.

(56) References Cited

U.S. PATENT DOCUMENTS

| | | | |
|---|---|---|---|
| 6,861,824 B1* | 3/2005 | Liu | H02J 7/0068 320/137 |
| 7,960,997 B2 | 6/2011 | Williams | |
| 9,671,437 B2* | 6/2017 | Akahane | H02H 3/08 |
| 9,673,192 B1 | 6/2017 | Lopata et al. | |
| 10,734,249 B2 | 8/2020 | Tan | |
| 10,958,167 B2 | 3/2021 | Price et al. | |
| 2010/0085025 A1* | 4/2010 | Kato | H02M 3/157 323/282 |
| 2011/0089931 A1* | 4/2011 | Podlisk | G01R 1/203 324/126 |
| 2015/0187414 A1 | 7/2015 | Perner | |
| 2017/0331371 A1 | 11/2017 | Parto | |
| 2019/0148795 A1 | 5/2019 | Hawley et al. | |
| 2020/0378244 A1 | 12/2020 | Cooley et al. | |
| 2021/0167606 A1 | 6/2021 | Carre et al. | |

FOREIGN PATENT DOCUMENTS

| | | |
|---|---|---|
| EP | 2966460 B1 | 3/2021 |
| JP | 3707355 B2 | 8/2005 |
| WO | 2021165952 A1 | 8/2021 |

OTHER PUBLICATIONS

EPO Search Report and Written Opinion for counterpart EP Appl. No. 23157895.6, report dated Jul. 14, 2023, 11 pgs.
"ProSLIC(r) Programmable CMOS SLIC/Codec with Ringing/Battery Voltage Generation," Silicon Labs, Si3210/Si3211, 2012, 149 pages.

* cited by examiner

*Primary Examiner* — Alex Torres-Rivera
(74) *Attorney, Agent, or Firm* — Crowe & Dunlevy LLC

(57) ABSTRACT

Disclosed herein is a wireless power reception system that utilizes a switched capacitor DC-DC voltage converter to charge a load. Current sensing circuits described herein enable the measurement of the input current to the switched capacitor DC-DC voltage converter while being relatively insensitive to temperature variation. Voltage/current sensing circuits described herein enable the selective measurement of load voltage, high side load current, and low side load current. One of the current sensing circuits may be used together with one of the voltage/current sensing circuits in a single device, or the current sensing circuits and voltage/current sensing circuits may be used separately in different devices.

18 Claims, 14 Drawing Sheets

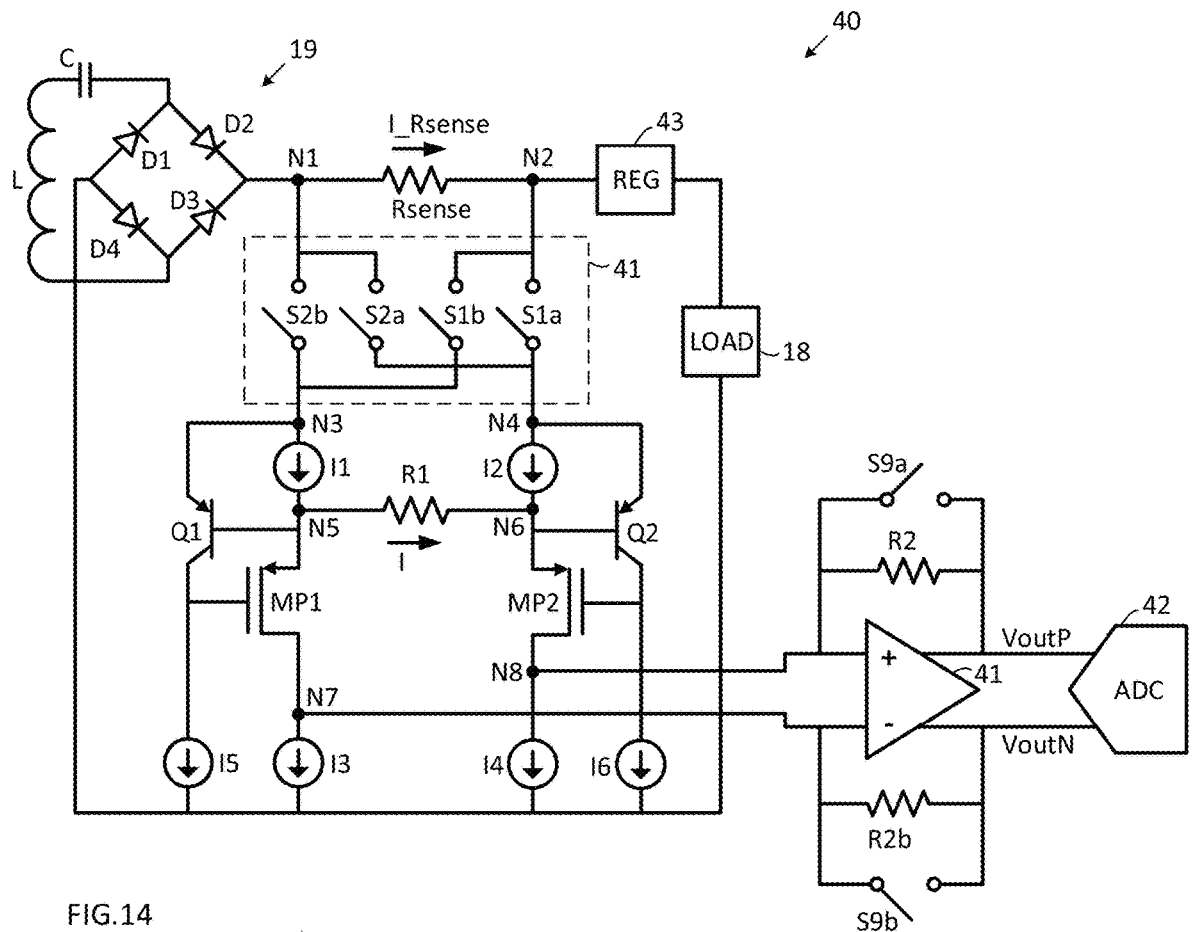
FIG.14
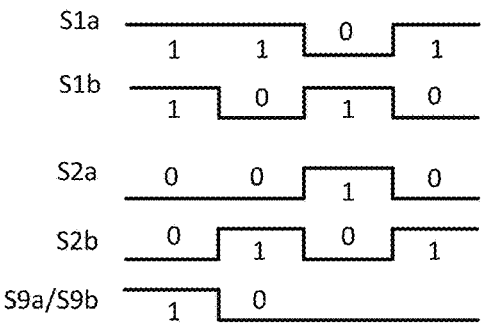
FIG.15
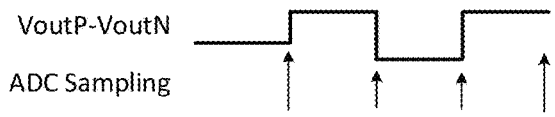

HARDWARE AND METHODS FOR VOLTAGE AND CURRENT SENSING

TECHNICAL FIELD

This disclosure is related to the field of DC-DC voltage converters and, more particularly, to hardware and methods for sensing the input current and output voltage/current in switched capacitor DC-DC voltage converters.

BACKGROUND

A sample known switched capacitor DC-DC converter 10 is now described with reference to FIGS. 1-2. The DC-DC converter 10 has an input (shown as node A) connected to an input pin to receive a bus voltage VBUS. An n-channel transistor QSW has its source connected to node A, its drain connected to node B, and its gate controlled by power control circuitry 11. A current sensing circuit 12 is connected between nodes A and B, with node B being connected to a PMID pin. Ripple currents occur in the switched capacitor DC-DC converter 10 due to the switching operation, and therefore the switching portion of the DC-DC converter 10 is split into two paths/phases to reduce ripple, one path being from node C (connected to node B) to the output pin VOUT, and the other path being from node D (connected to node B) to the output pin VOUT.

In greater detail, the first path includes: an n-channel transistor QCH1 having its drain connected to node C, its source connected to a CTOP SC1 pin, and its gate connected to a switch control circuit 13; an n-channel transistor QDH1 having its drain connected to the CTOP SC1 pin, its source connected to the output pin VOUT, and its gate connected to the switch control circuit 13; an n-channel transistor QCL1 having its drain connected to the output pin VOUT, its source connected to a CBOT SC1 pin, and its gate connected to a switch control circuit 15; and an n-channel transistor QDL1 having its drain connected to the CBOT SC1 pin, its source connected to ground, and its gate connected to the switch control circuit 15.

In greater detail, the second path includes: an n-channel transistor QCH2 having its drain connected to node D, its source connected to a CTOP SC2 pin, and its gate connected to a switch control circuit 14; an n-channel transistor QDH2 having its drain connected to the CTOP SC2 pin, its source connected to the output pin VOUT, and its gate connected to the switch control circuit 14; an n-channel transistor QCL2 having its drain connected to the output pin VOUT, its source connected to a CBOT SC2 pin, and its gate connected to a switch control circuit 16; and an n-channel transistor QDL2 having its drain connected to the CBOT SC2 pin, its source connected to ground, and its gate connected to the switch control circuit 16.

Input current is commonly measured at either node A or node B. Generally, current measurement at node B is desirable because it also tracks current incoming from the PMID pin. However, due to physical layout constraints, node B may not be readily accessible, and therefore the current at nodes C and D (which are readily accessible) is instead measured and summed. However, despite the use of two paths to reduce the ripple current, an undesirable amount of ripple current it still present.

These ripple current issues will now be discussed greater in detail, first for the case of a single path switched capacitor DC-DC converter, and then for a dual path switched capacitor DC-DC converter.

Refer to the example of FIG. 3, showing a simple known switched capacitor DC-DC converter 11 formed by a sense resistor Rs connected between an input IN and a first terminal of a first switch S1, a capacitor C connected between a second terminal of the first switch S1 and ground, and a second switch S2 connected between the capacitor C and the output OUT. A timing diagram showing operation of this circuit may be seen in FIG. 4, where a ripple (spike in magnitude) can be observed in the current I_Rs flowing through the sense resistor Rs at each instance of switch S1 closing.

Refer now to the example of FIG. 5, showing a simple known dual path switched capacitor DC-DC converter 12 formed by: a first sense resistor Rs1 connected between an input IN and a first terminal of a first switch S11, a first capacitor C1 connected between a second terminal of the first switch S11 and ground, and a second switch S21 connected between the capacitor C and the output OUT; and a second sense resistor Rs2 connected between the input IN and a first terminal of a third switch S12, a second capacitor C2 connected between a second terminal of the third switch S12 and ground, and a fourth switch S22 connected between the second capacitor C2 and the output OUT. A timing diagram showing operation of this circuit may be seen in FIG. 6, where a ripple can be observed in the current I_Rs1 flowing through sense resistor Rs1 at each instance of switch S11 closing and can be observed in the current I_Rs2 flowing through the sense resistor Rs2 at each instance of switch S12 closing.

Although the ripples in I_Rs1 and I_Rs2 are lesser in magnitude than the ripple in I_Rs (from FIG. 4), they are still present. Current sensing techniques therefore focus on filtering these ripple currents.

Turn now to the prior art current sensor 13 example shown in FIG. 7. Assume here that the resistors Rs1 and Rs2 are the sense resistors of the dual path switched capacitor DC-DC converter 12 of FIG. 5, with the rest of the dual path switched capacitor DC-DC converter 12 not being shown for brevity. The current sensor 13 includes a first amplifier 14 having the resistor Rs1 connected across its input terminals and providing output through a low-pass filter to a first input of a multiplexer 16, and a second amplifier 17 having the resistor Rs2 connected across its input terminals and providing output through a low-pass filter 18 to a second input of the multiplexer (MUX) 16. Since the currents I_Rs1 and I_Rs2 are opposite in phase, the MUX 16 is set to accordingly switch between passing those currents such that the output of the MUX 16 is effectively a sum of the currents I_Rs1 and I_Rs2. An analog to digital converter (ADC) 19 digitizes the output of the MUX 16 to produce a digital code representative of the sum of the sense currents I_Rs1 and I_Rs2.

In operation, the frequency of the currents I_Rs1 and I_Rs2 will be approximately equal to the switching frequency of the switches of the dual path switched capacitor DC-DC converter. Therefore, to sense the voltage across the sense resistors Rs1 and Rs2 with the ADC 19, the sampling frequency of the ADC 19 would need to be substantially higher than the frequency of the currents I_Rs1 and I_Rs2 to avoid aliasing, increasing cost and complexity. Thus, the low-pass filters 15 and 18 are used to average the currents I_Rs1 and I_Rs2 to thereby remove their high-frequency components, enabling the use of a slower ADC.

While this design of the current sensor 13 can produce acceptable results, notice that it utilizes two amplifiers 14 and 17, two low-pass filters 15 and 18, and a MUX 19. These low-pass filters 15 and 18 may be relatively large depending on the switching frequency of the dual path switched capacitor DC-DC converter. Given this, the design of the current sensor 13 may be much larger than desired (particularly if the amplifiers 14 and 17 are fully differential), and further development is therefore needed.

SUMMARY

Disclosed herein is a DC-DC switching converter, including: an input and an output; a first switched capacitor path connected between the input and the output, the first switched capacitor path including a first sense resistor through which a first input current flows; a second switched capacitor path connected between the input and the output, the second switched capacitor path including a second sense resistor through which a second input current flows; a first current to voltage amplifier having inputs coupled across the first sense resistor and configured to output a first intermediate voltage representative of the first input current; a second current to voltage amplifier having inputs coupled across the second sense resistor and configured to output a second intermediate voltage representative of the second input current; a summing amplifier configured to sum the first and second intermediate voltages to produce an amplifier output signal; and a low-pass amplifier configured to filter high frequency ripple currents from the amplifier output signal to produce an output signal indicative of an input current to the DC-DC switching converter.

The summing amplifier may include: a first resistor coupled between the first intermediate voltage and a first node; a second resistor coupled between the second intermediate voltage and the first node; an operational amplifier having a non-inverting input coupled to the first node and an inverting input coupled to a second node; a third resistor coupled between the first node and an output of the operational amplifier; and a fourth resistor coupled between the second node and the output of the operational amplifier.

The summing amplifier may include a fifth resistor coupled between the second node and ground.

The first switched capacitor path and the second switched capacitor path may each have a same switching frequency. The amplifier output signal may have high frequency ripples therein occurring at twice the frequency of said same switching frequency. The high frequency ripple currents filtered from the amplifier output signal may be the high frequency ripples that occur at twice the frequency of said same switching frequency.

Also disclosed herein is a current sensor for sensing an input current to a switched capacitor voltage converter, including: a first current to voltage amplifier configured to output a first intermediate voltage representative of a first sense current; a second current to voltage amplifier configured to output a second intermediate voltage representative of a second sense current; a summing amplifier configured to sum the first and second intermediate voltages to produce an amplifier output signal; and a low-pass amplifier configured to filter high frequency ripple currents from the amplifier output signal, to produce an output signal indicative of an input current to the DC-DC switching converter, the high frequency ripple currents occurring at twice a switching frequency of the switched capacitor voltage converter.

The summing amplifier may include: a first resistor coupled between the first intermediate voltage and a first node; a second resistor coupled between the second intermediate voltage and the first node; an operational amplifier having a non-inverting input coupled to the first node and an inverting input coupled to a second node; a third resistor coupled between the first node and an output of the operational amplifier; and a fourth resistor coupled between the second node and the output of the operational amplifier.

The summing amplifier may include a fifth resistor coupled between the second node and ground.

Also disclosed herein is a current sensor, including: a sense resistance coupled to receive an input current from a power source and an amplification circuit. The amplification circuit includes: an amplifier having inputs across which the sense resistance is coupled and an output at which a voltage representative of the input is produced; a first resistor coupled to at least one of the inputs of the amplifier; and a second resistor coupled to at least one of the inputs of the amplifier. A gain of the amplification circuit is based upon a resistance of the second resistor and a ratio of a resistance of the sense resistor to a resistance of the first resistor. The first resistor and the sense resistor are formed from same materials in a same substrate and arranged in a ratiometric relationship such that the first resistor and sense resistor change temperature substantially equally during operation and such that the first resistor and sense resistor vary substantially equally in resistance over temperature.

The sense resistor may be formed from a plurality of connected elementary sense resistor units. The first resistor may be formed from a plurality of connected elementary first resistor units surrounding the plurality of connected elementary sense resistor units on at least two sides. Each of the plurality of elementary sense resistor units may include a plurality of parallel metal sheets electrically connected in parallel to one another by vias. Each of the plurality of elementary first resistor units may include a plurality of parallel metal sheets electrically connected in series to one another by vias.

The vias electrically connecting the plurality of parallel metal sheets of the plurality of elementary sense resistor units in parallel may be substantially lesser in resistance than the plurality of parallel metal sheets of the plurality of elementary sense resistor units but not negligible as compared to the resistance of the plurality of parallel metal sheets of the plurality of elementary sense resistor units. The vias electrically connecting the plurality of parallel metal sheets of the plurality of elementary first resistor units in series may be substantially lesser in resistance than the plurality of parallel metal sheets of the plurality of elementary first resistor units but not negligible as compared to the resistance of the plurality of parallel metal sheets of the plurality of elementary first resistor units.

The vias electrically connecting the plurality of parallel metal sheets of the plurality of elementary sense resistor units in parallel may be lesser in resistance than the plurality of parallel metal sheets of the plurality of elementary sense resistor units by at least 90%. The vias electrically connecting the plurality of parallel metal sheets of the plurality of elementary first resistor units in parallel may be lesser in resistance than the plurality of parallel metal sheets of the plurality of elementary first resistor units by at least 90%.

The plurality of parallel metal sheets of the plurality of elementary sense resistor units may have identical width, length, and thickness dimensions. The plurality of parallel metal sheets of the plurality of elementary first sense resistor units may have identical width, length, and thickness dimensions. The width, length, and thickness dimensions of the plurality of parallel metal sheets of the plurality of elementary sense resistor units may be substantially equal to the width, length, and thickness dimensions of the plurality of parallel metal sheets of the plurality of first sense resistor units.

The plurality of connected elementary sense resistor units may be arranged to be laterally adjacent to and aligned with one another in the substrate. Each of the plurality of connected elementary sense resistor units may be formed of: a first metal sheet; a second metal sheet; a third metal sheet; first vias connecting a bottom face of the second metal sheet to a top face of the first metal sheet; second vias connecting a bottom face of the third metal sheet to a top face of the second metal sheet; and third vias connected to a top face of the third metal sheet. Terminals may be connected to the third vias of laterally adjacent ones of the plurality of connected elementary sense resistor units.

The plurality of connected elementary first resistor units may be arranged to be laterally adjacent to and aligned with one another in the substrate. Each of the plurality of connected elementary first resistor units may be formed of: a first metal sheet; a second metal sheet divided into first and second spaced apart portions laying in a same plane; a third metal sheet divided into first and second spaced apart portions laying in a same plane; first vias connecting a top face of the first metal sheet to bottom faces of the first and second portions of the second metal sheet; second vias connecting top faces of the first and second portions of the second metal sheet to bottom faces of the first and second portions of the third metal sheet; and third vias connected to top faces of the first and second portions of the third metal sheet. Terminals may be connected to the third vias of laterally adjacent ones of the plurality of connected elementary first resistor units.

The plurality of connected elementary first resistor units may be arranged to be laterally adjacent to and aligned with one another in the substrate. Each of the plurality of connected elementary first resistor units may be formed of: a first metal sheet; a second metal sheet; a third metal sheet; first vias connecting a bottom face of the second metal sheet to a top face of the first metal sheet; second vias connecting a bottom face of the third metal sheet to a top face of the second metal sheet; and third vias connected to a top face of the third metal sheet. Terminals may be connected to the third vias of laterally adjacent ones of the plurality of connected elementary first resistor units.

Each of the plurality of connected elementary sense resistor units may be dimensionally identical to each of the plurality of connected elementary first resistor units, with the plurality of connected elementary first resistor units being greater in number.

The sense resistor may be formed from a plurality of parallel connected elementary sense resistor units. The plurality of connected elementary sense resistor units may be arranged to be laterally adjacent to and aligned with one another in the substrate. Each of the plurality of elementary sense resistor units may include a metal sheet and vias, with terminals connected to the vias of laterally adjacent ones of the plurality of elementary sense resistor units.

The first resistor may be formed from a plurality of series connected elementary first resistor units surrounding the plurality of connected elementary sense resistor units on at least two sides. The plurality of connected elementary first resistor units may be arranged to be laterally adjacent to and aligned with one another in the substrate. Each of the plurality of elementary first resistor units may include a metal sheet and vias connected to the metal sheet, with terminals connected to the vias of laterally adjacent ones of the plurality of elementary first resistor units.

The metal sheets of the elementary sense resistor units may have a same length but greater width than metal sheets of the elementary first resistor units.

The sense resistance may be coupled between first and second nodes and receiving the input current from the power source. The amplification circuit may include: a chopper having inputs coupled to the first and second nodes and outputs coupled to third and fourth nodes; a first current source coupled between the third node and a fifth node; a second current source coupled between the fourth node and a sixth node; the first resistor coupled between the fifth node and the sixth node; a first p-channel transistor having a source coupled to the fifth node, a drain coupled to a seventh node, and a gate; a third current source coupled between the seventh node and ground; a second p-channel transistor having a source coupled to the sixth node, a drain coupled to an eighth node, and a gate; a fourth current source coupled between the eighth node and ground; a first PNP transistor having an emitter coupled to the third node, a base coupled to the fifth node, and a collector coupled to the gate of the first p-channel transistor; a fifth current source coupled between the collector of the first PNP transistor and ground; a second PNP transistor having an emitter coupled to the fourth node, a base coupled to the sixth node, and a collector coupled to the gate of the second p-channel transistor; a sixth current source coupled between the collector of the second PNP transistor and ground; the amplifier having a non-inverting input coupled to the eighth node, an inverting input coupled to the seventh node, a first output, and a second output; and a second resistor coupled between the non-inverting input and first output of the amplifier. A third resistor may be coupled between the inverting input and second output of the amplifier, the third resistor being a replica of the second resistor. The chopper may be configured to auto-zero the amplification circuit during an initial phase, and may be configured to subsequently alternate between: a) connecting the first node to the third node and connecting the second node to the fourth node, and b) connecting the second node to the third node and connecting the first node to the fourth node. The amplifier may be configured to auto-zero during the initial phase.

Also disclosed herein is a configurable voltage/current sensor, including: a differential amplifier having first and second differential inputs and first and second differential outputs; a high-side sense resistor connected between a power source node and a first load node; a load connected between the first load node and a second load node; and an input multiplexing circuit. The input multiplexing circuit may be configurable to selectively connect: the power source node to a first input node or a second input node; the first load node to the first input node or the second input node; or the second load node to the first input node or the second input node. A first programmable gain circuit is configurable to selectively connect: the first input node through a first capacitor or a second capacitor to the first differential input of the differential amplifier; the second input node through the first capacitor or the second capacitor to the first differential input of the differential amplifier; the first capacitor or the second capacitor between the first differential input and the first differential output of the differential amplifier; and the first differential input to the first differential output of the differential amplifier. A second programmable gain circuit may be configurable to selectively connect: the first input node through a third capacitor or a fourth capacitor to the second differential input of the differential amplifier; the second input node through the third capacitor or the fourth capacitor to the second differential input of the differential amplifier; the third capacitor or the fourth capacitor between the second differential input and the second differential output of the differential amplifier; and the second differential input to the second differential output of the differential amplifier.

An analog-to-digital converter may be configured to digitize an output of the differential amplifier.

A state machine may be configured to, in a battery voltage sensing mode, in a reset phase: cause the input multiplexing circuit to connect the first input node and the second input node to the first load node; cause the first programmable gain circuit to connect the first differential input and first differential output of the differential amplifier, and cause the second programmable gain circuit to connect the second differential input and second differential output of the differential amplifier
; cause the first programmable gain circuit to connect the first capacitor between the first input node and the first differential input, and connect the second capacitor between the first differential input and the first differential output; and cause the second programmable gain circuit to connect the third capacitor between the second input node and the second differential input, and connect the fourth capacitor between the second differential input and the second differential output.

The state machine may be configured to, in a measurement phase: cause the input multiplexing circuit to connect the second load node to the first input node and connect the first load node to the second input node; cause the first programmable gain circuit to connect the second capacitor between the first input node and the first differential input, and connect the first capacitor between the first differential input and the first differential output, and cause the second programmable gain circuit to connect the fourth capacitor between the second input node and the second differential input, and connect the third capacitor between the second differential input and the second differential output of the differential amplifier. The first and second differential outputs may represent the battery voltage.

The state machine may be configured to, in a first chopping phase, cause the input multiplexing circuit to connect the second load node to the second input node and connect the first load node to the first input node.

The state machine may be configured to, in a second chopping phase, cause the input multiplexing circuit to connect the second load node to the first input node and connect the first load node to the second input node.

The state machine may be configured to, in a high-side current sensing mode, in a reset phase: cause the input multiplexing circuit to connect the first input node and the second input node to the first load node; cause the first programmable gain circuit to connect the first differential input and first differential output of the differential amplifier, and cause the second programmable gain circuit to connect the second differential input and second differential output of the differential amplifier; cause the first programmable gain circuit to connect the first capacitor between the first input node and the first differential input, and connect the second capacitor between the first differential input and the first differential output; and cause the second programmable gain circuit to connect the third capacitor between the second input node and the second differential input, and connect the fourth capacitor between the second differential input and the second differential output. In a measurement phase, the state machine may be configured to: cause the input multiplexing circuit to connect the first load node to the first input node and connect the power source node to the second input node; cause the first programmable gain circuit to connect the second capacitor between the first input node and the first differential input, and connect the first capacitor between the first differential input and the first differential output; and cause the second programmable gain circuit to connect the fourth capacitor between the second input node and the second differential input, and connect the third capacitor between the second differential input and the second differential output of the differential amplifier. The first and second differential outputs may represent the battery high-side current.

The state machine may be configured to, in a first chopping phase, cause the input multiplexing circuit to connect the second load node to the second input node and connect the first load node to the first input node.

The state machine may be configured to, in a second chopping phase, cause the input multiplexing circuit to connect the second load node to the first input node and connect the first load node to the second input node.

There may be a low-side sense resistor connected between the second load node and ground. The state machine may be configured to, in a low-side current sensing mode, in a reset phase: cause the input multiplexing circuit to connect the first input node and the second input node to the second load node; cause the first programmable gain circuit to connect the first differential input and first differential output of the differential amplifier, and cause the second programmable gain circuit to connect the second differential input and second differential output of the differential amplifier; cause the first programmable gain circuit to connect the first capacitor between the first input node and the first differential input, and connect the second capacitor between the first differential input and the first differential output; and cause the second programmable gain circuit to connect the third capacitor between the second input node and the second differential input, and connect the fourth capacitor between the second differential input and the second differential output. In a measurement phase, the state machine may be configured to: cause the input multiplexing circuit to connect the second load node to the first input node and connect ground to the second input node; cause the first programmable gain circuit to connect the second capacitor between the first input node and the first differential input, and connect the first capacitor between the first differential input and the first differential output; and cause the second programmable gain circuit to connect the fourth capacitor between the second input node and the second differential input, and connect the third capacitor between the second differential input and the second differential output of the differential amplifier. The first and second differential outputs may represent the low-side current.

The state machine may be configured to, in a first chopping phase, cause the input multiplexing circuit to connect the second load node to the second input node and connect ground to the first input node.

The state machine may be configured to, in a second chopping phase, cause the input multiplexing circuit to connect the second load node to the first input node and connect ground to the second input node.

The input multiplexing circuit may include: a first switch connected between the power source node and the first input node; a second switch connected between the power source node and the second input node; a third switch connected between the first load node and the first input node; a fourth switch connected between the first load node and the second input node; a fifth switch connected between the second load node and the first input node; and a sixth switch connected between the second load node and the second input node.

The first programmable gain circuit may include: a seventh switch connected between the first input node and a first node; an eighth switch connected between the first node and the first differential output; a ninth switch connected between the first input node and a second node; a tenth switch connected between the second node and the first differential output; an eleventh switch connected between the first differential input and the first differential output; the first capacitor coupled between the second node and the first differential input; and the second capacitor coupled between the first node and the first differential input.

The second programmable gain circuit may include: a twelfth switch connected between the second input node and a third node; a thirteenth switch connected between the third node and the second differential output; a fourteenth switch connected between the second input node and a fourth node; a fifteenth switch connected between the fourth node and the second differential output; a sixteenth switch connected between the second differential input and the second differential output; the fourth capacitor connected between the third node and the second differential input; and the third capacitor connected between the fourth node and the second differential input.

BRIEF DESCRIPTION OF THE DRAWINGS

FIG. 14 is a schematic block diagram of another current sensor disclosed herein such as may be used to sense the current through a sense resistor.

FIG. 15 is a timing diagram showing the switching of the current sensor of FIG. 14 in operation.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein. Do note that in the below description, any described resistor or resistance is a discrete device unless the contrary is stated, and is not simply an electrical lead between two points. Thus, any described resistor or resistance coupled between two points has a greater resistance than a lead between those two points would have, and such resistor or resistance cannot be interpreted to be a lead. Similarly, any described capacitor or capacitance is a discrete device unless the contrary is stated, and is not a parasitic unless the contrary is stated. Moreover, any described inductor or inductance is a discrete device unless the contrary is stated, and is not a parasitic unless the contrary is stated.

Figure 1:
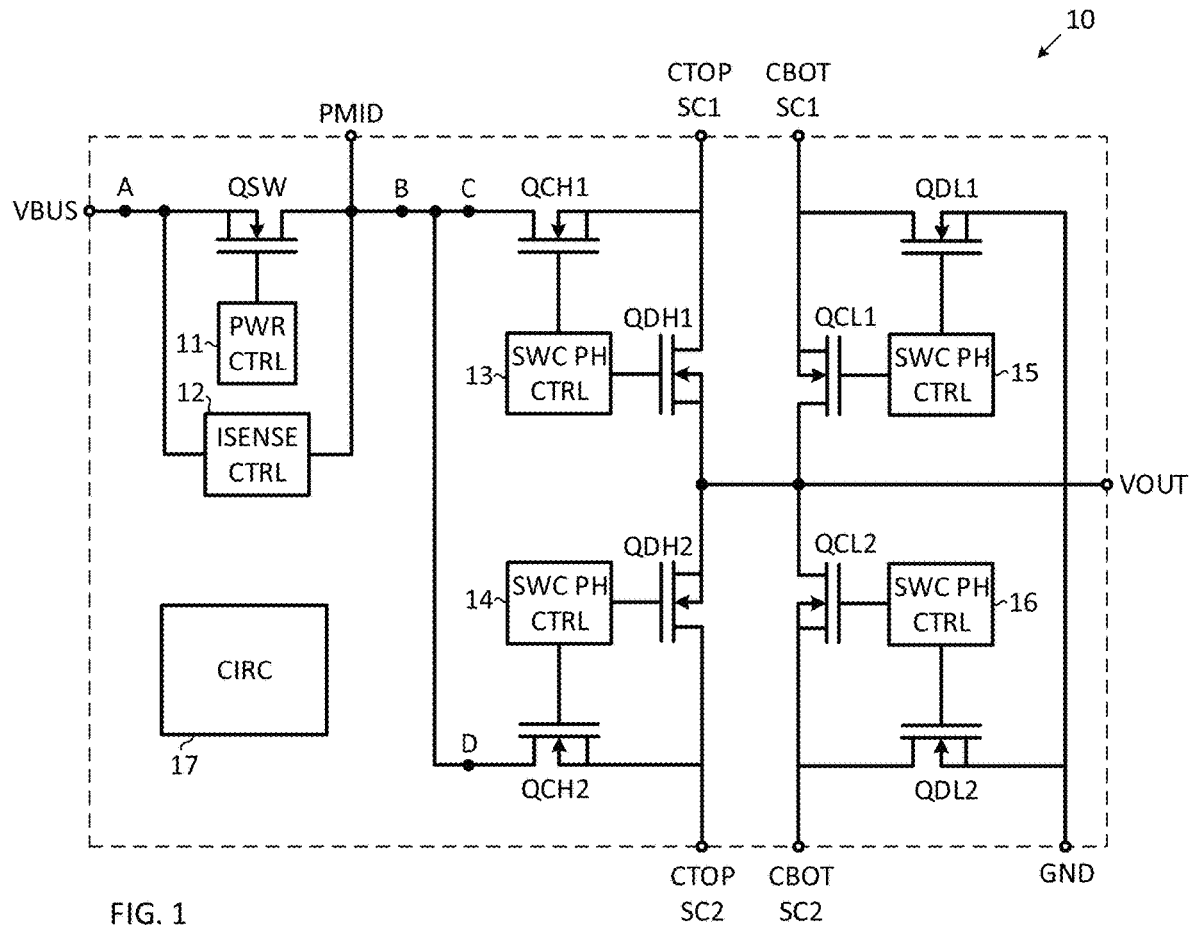
FIG. 1 is a schematic block diagram of a known switched capacitor DC-DC converter including current sensing.
Figure 2:
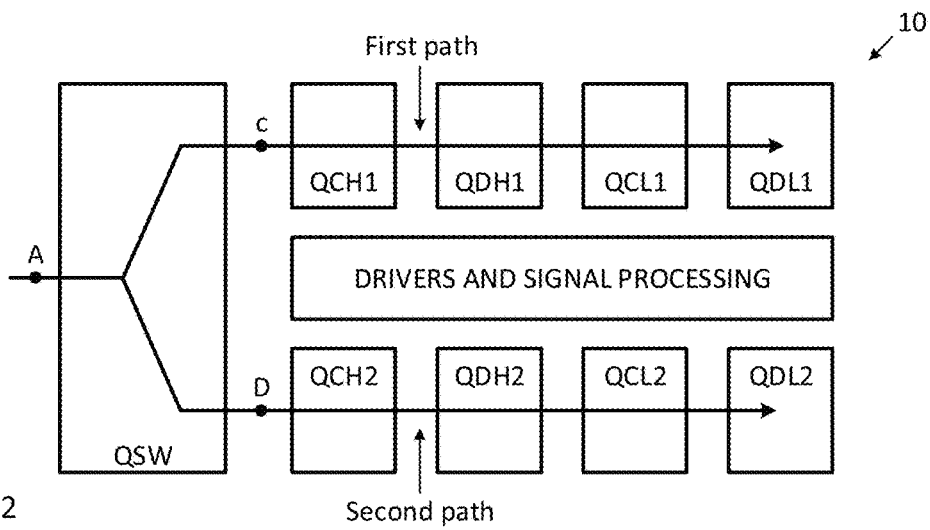
FIG. 2 is a diagrammatical representation of the direction of current flow in the switched capacitor DC-DC converter of FIG. 1.
Figure 3:
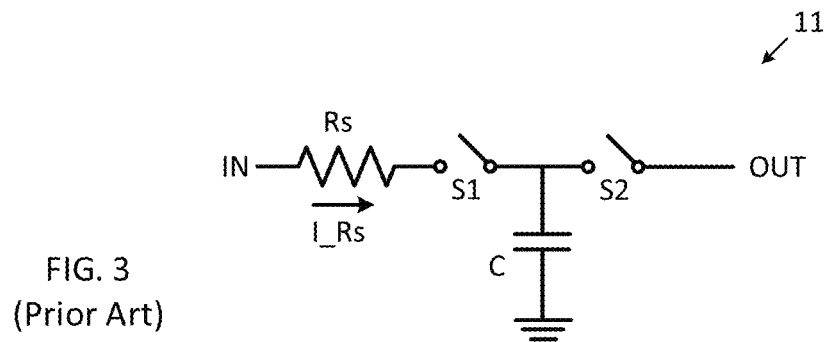
FIG. 3 is a schematic diagram of a known single-path switched capacitor DC-DC converter.
Figure 4:
FIG. 4 is a timing diagram showing operation of the switched capacitor DC-DC converter of FIG. 3 in operation.
Figure 5:
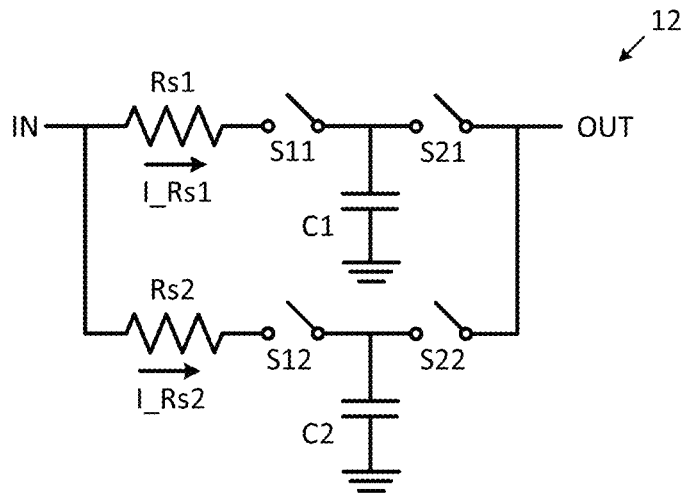
FIG. 5 is a schematic diagram of a known dual-path switched capacitor DC-DC converter.
Figure 6:
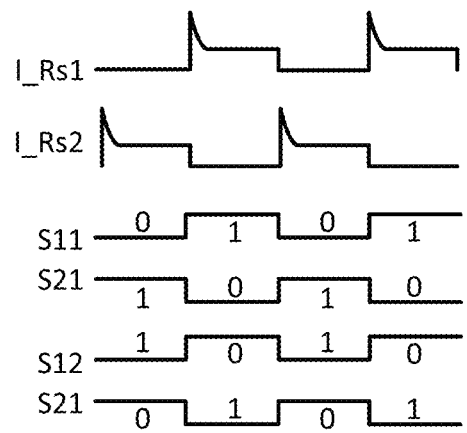
FIG. 6 is a timing diagram showing operation of the switched capacitor DC-DC converter of FIG. 5 in operation.
Figure 8:
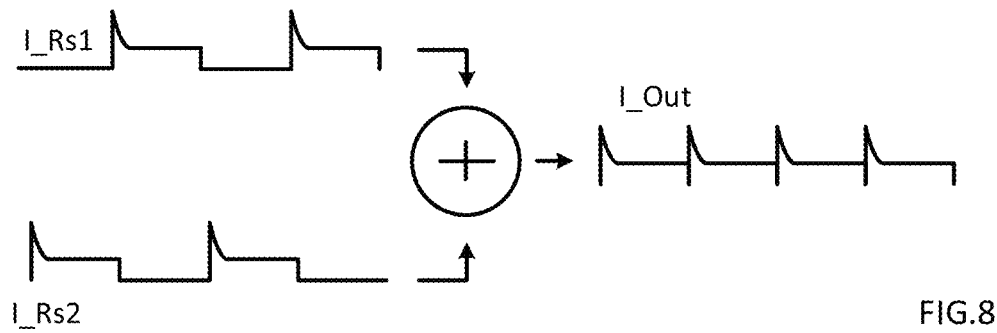
FIG. 8 is a diagram showing the principle of operation desired for the current sensor described herein for use in a dual-path switched capacitor DC-DC converter such as that of FIG. 5.

Referring now to FIG. 8, keeping in mind the dual path switched capacitor DC-DC converter 12 of FIG. 5, the goal for a current sensor is to sense the current I_Rs1 flowing through sense resistor Rs1 and the current I_Rs2 flowing through sense resistor Rs2, then sum I_Rs1 and I_Rs2 to produce an output current I_Out that is representative of the input current to the dual path switched capacitor DC-DC converter 12.

Figure 9:
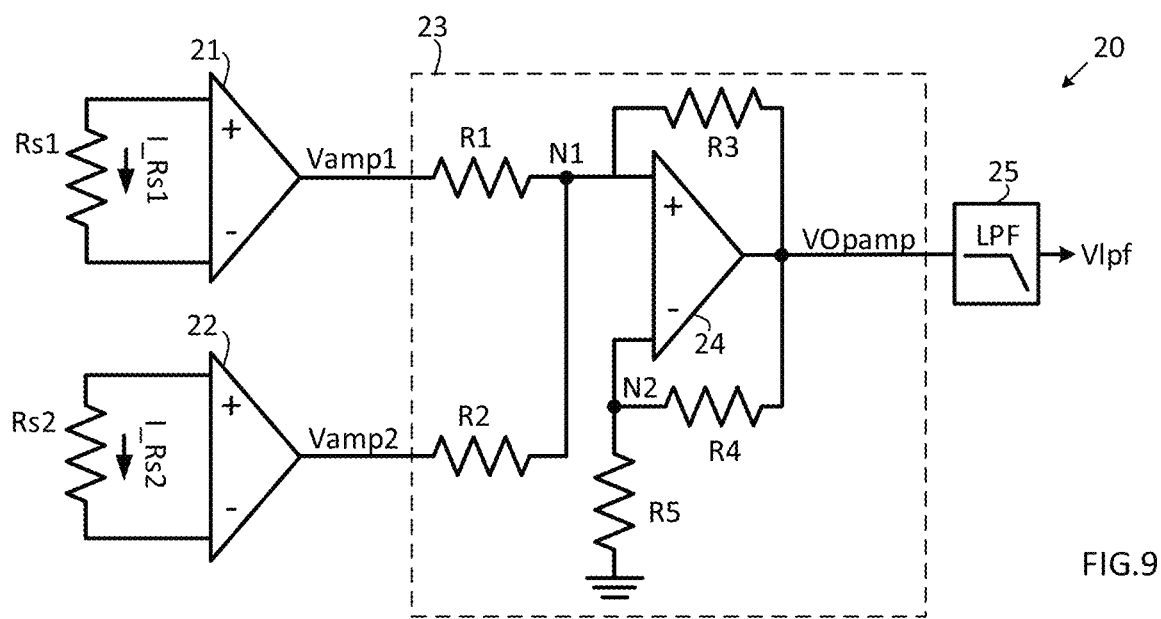
FIG. 9 is a schematic block diagram of a current sensor disclosed herein for use in a dual-path switched capacitor DC-DC converter such as that of FIG. 5.

A current sensor 20 that performs this functionality is now described with reference to FIG. 9. The current sensor 20 includes a first amplifier 21 having its inputs connected across the sense resistor Rs1, and a second amplifier 22 having its inputs connected across the sense resistor Rs2. The outputs of the amplifiers 21 and 22 are connected to the inputs of a summing amplifier 23.

The summing amplifier 23 includes a first resistor R1 connected between the output of the amplifier 21 and node N1, and a second resistor R2 connected between the output of the amplifier 22 and node N1. A third amplifier 24 (e.g., an operational amplifier) has its non-inverting terminal connected to node N1 and its inverting terminal connected to node N2. A third resistor R3 is connected between node N1 and the output of the third amplifier 24, and a fourth resistor R4 is connected between node N2 and the output of the third amplifier 24. A fifth resistor R5 is connected between node N2 and ground.

A low-pass filter 25 filters the output of the summing amplifier 23.

In operation, the amplifier 21 outputs a voltage Vamp1 indicative of the current I_Rs1 through the sense resistor Rs1, and the amplifier 22 outputs a voltage Vamp2 indicative of the current I_Rs1 through the sense resistor Rs2. The summing amplifier 23 sums the voltages across the sense resistors Rs1 and Rs2 to produce the voltage VOpamp as output, which is turn filtered by the low-pass filter 25. The low-pass filter 25 provides the output Vlpf that can be read and from which the input current to the dual path switched capacitor DC-DC converter 12 can be determined.

Figure 7:
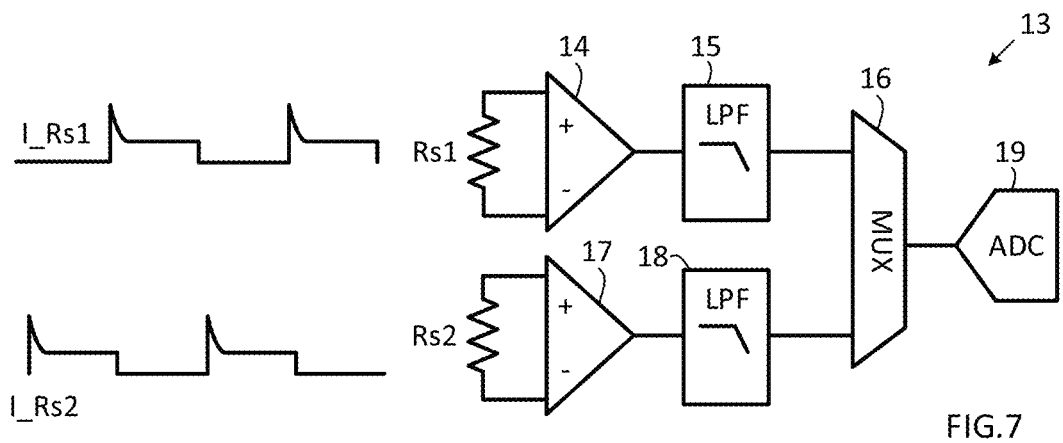
FIG. 7 is a schematic block diagram of a known current sensor for use in a dual-path switched capacitor DC-DC converter such as that of FIG. 5.

The result of the summing performed by the summing amplifier 23 is that the frequency of the ripple in the output signal Vlpf is twice that of the frequency of the switching frequency of the dual path switched capacitor DC-DC converter 12. As a result, the cut-off frequency of the low-pass filter 25 is doubled, having the result of reducing the resistance and capacitance of the resistor and capacitor within the low-pass filter 25, in turn reducing the physical size of the resistor and capacitor by half. Therefore, as compared to the current sensor 13 of FIG. 7, the physical area occupied by the low-pass filter 25 of the current sensor 20 is one quarter (since there is one low-pass filter instead of two, and since the resistor and capacitor area of that one low-pass filter is half that of the resistor and capacitor area of either of the low-pass filters of the current sensor 13). This greatly reduces the overall area consumed by the current sensor 20 as opposed to the prior art current sensor 13, which is advantageous in many applications in which it is desired to conserve area.

Figure 10:
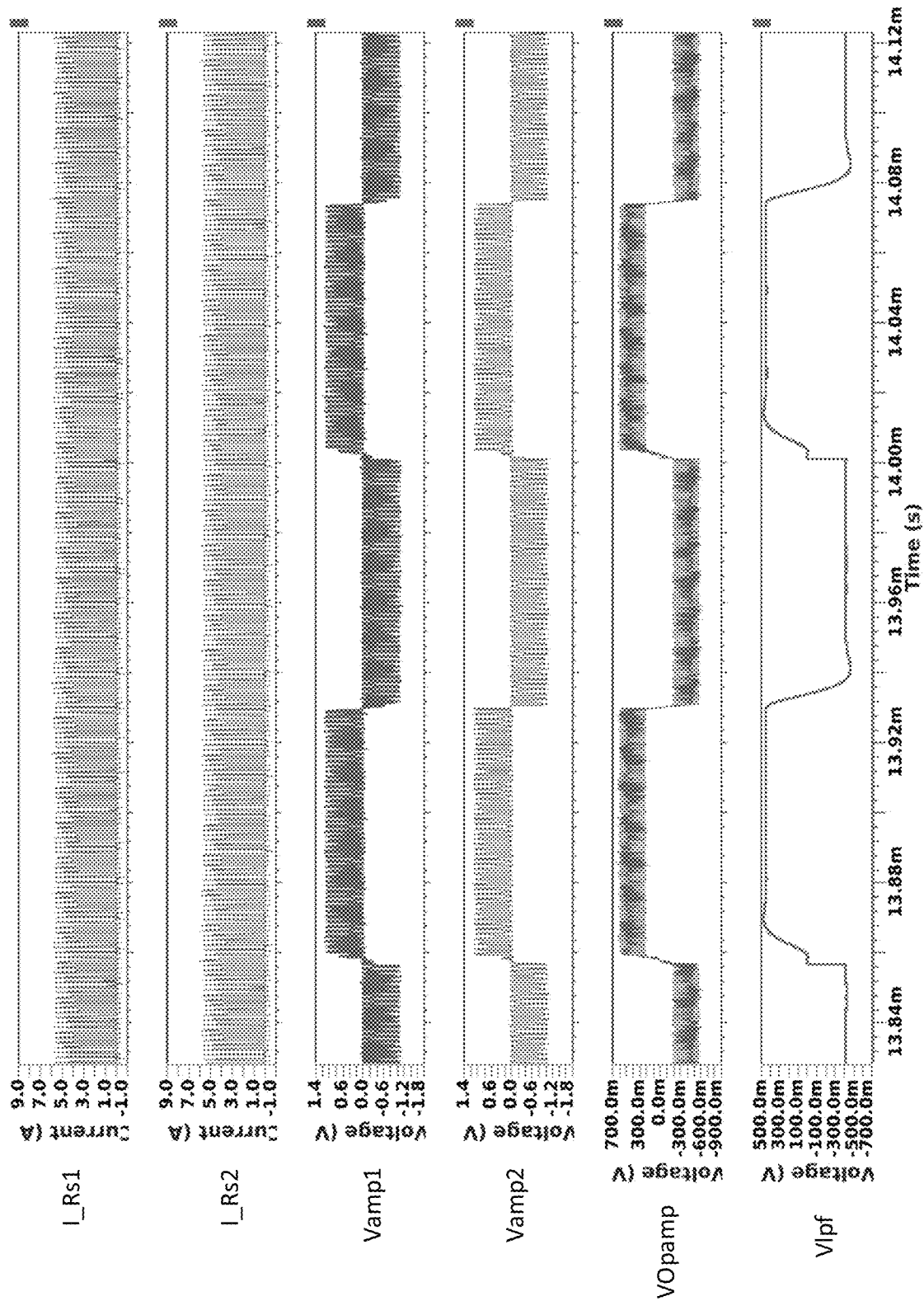
FIG. 10 is a graph showing full current and voltage waveforms within the current sensor of FIG. 9 during operation.
Figure 11:
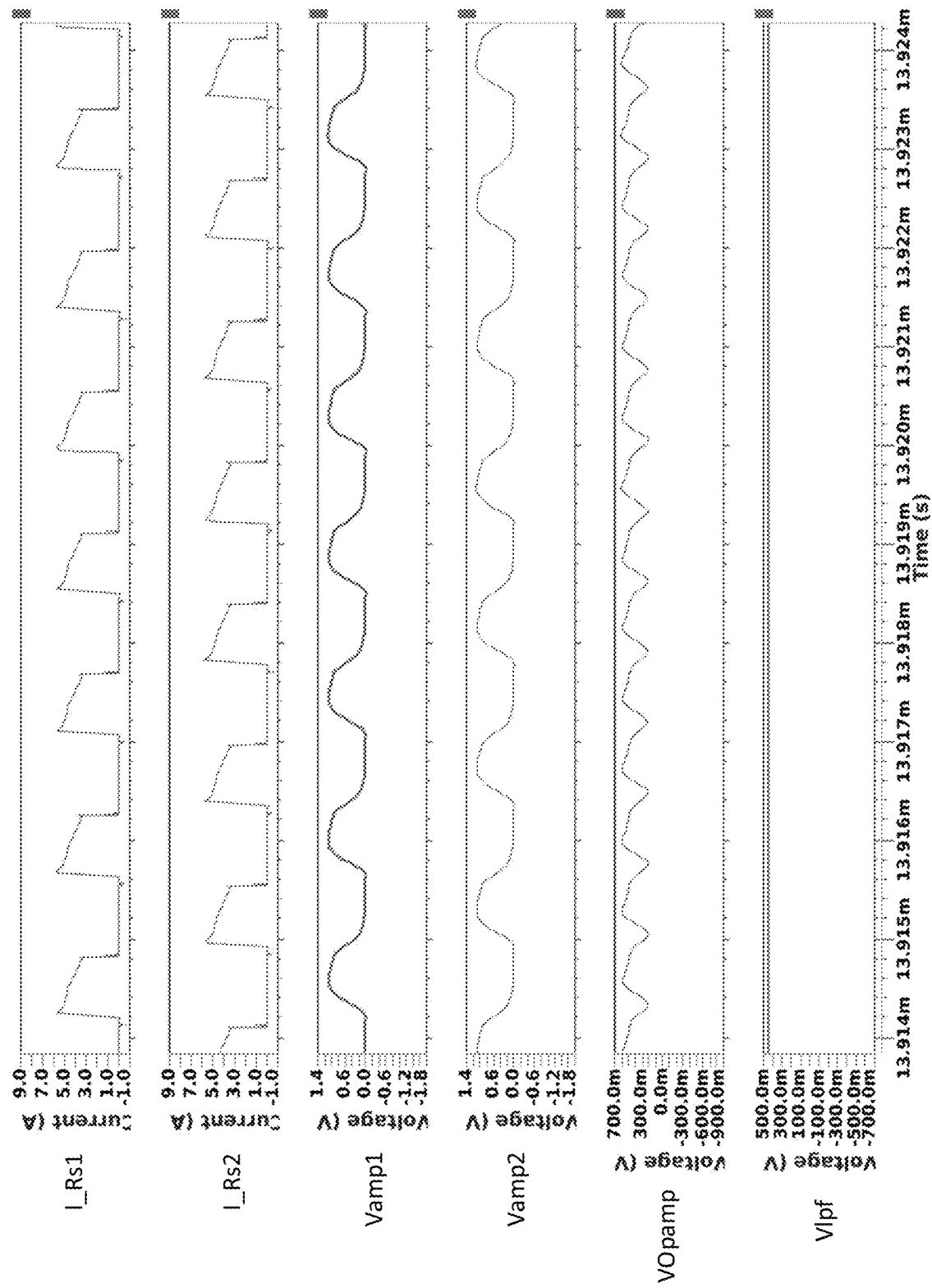
FIG. 11 is a graph showing greatly enlarged partial current and voltage waveforms within the current sensor of FIG. 9 during operation.

Waveforms showing the operation of the current sensor 20 may be seen in FIGS. 10-11. Full waveforms may be seen in FIG. 10, and greatly enlarged partial waveforms may be seen in FIG. 11.

Figure 12:
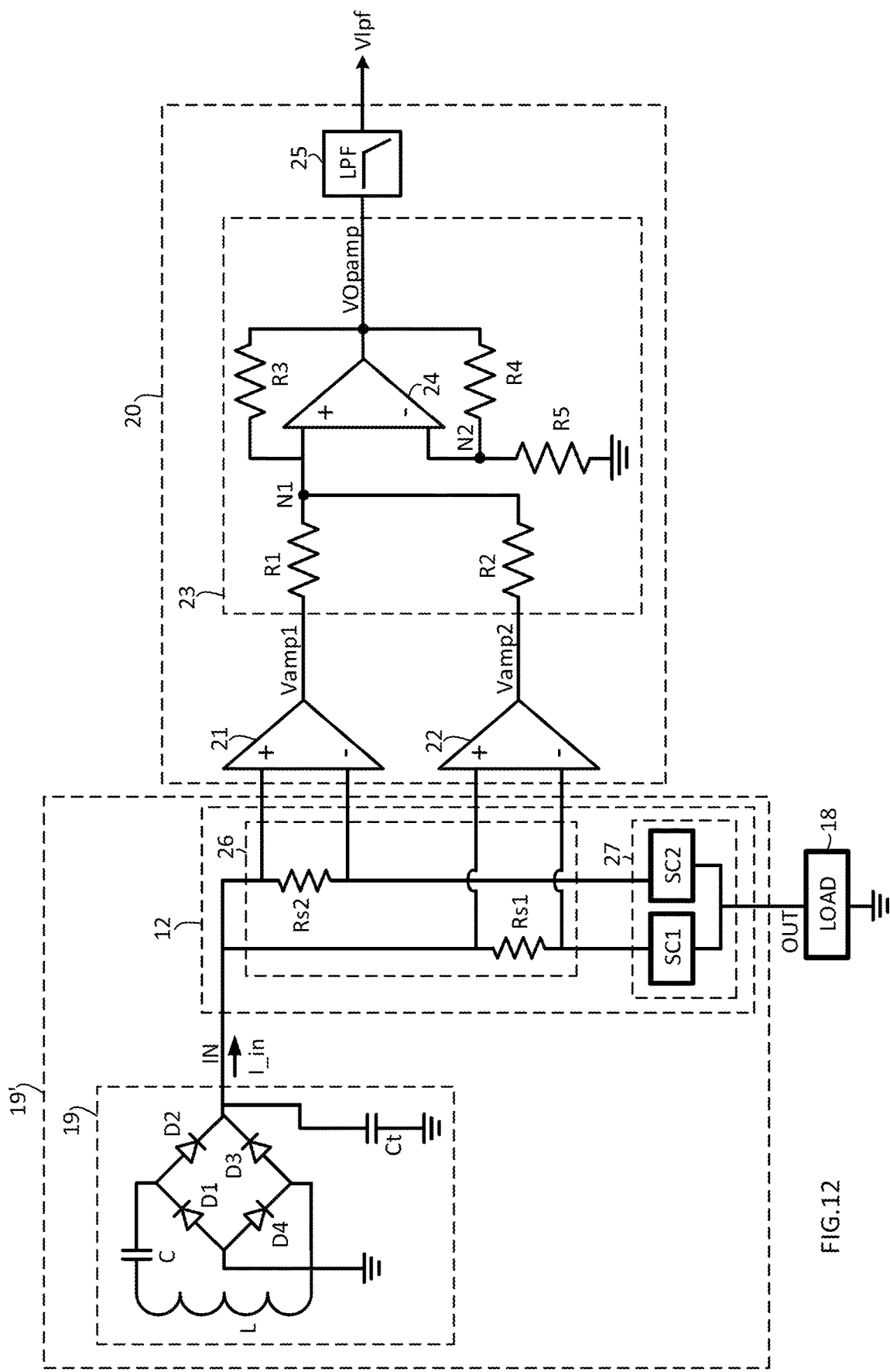
FIG. 12 is a schematic block diagram of the current sensor of FIG. 9 as implemented in a sample dual-path switched capacitor DC-DC converter.

An example implementation of the current sensor 20 used to detect the input current I_in to a dual path switched capacitor DC-DC converter 12 from a power source 19 is shown in FIG. 12. Notice the single input node IN of the dual path switched capacitor DC-DC converter 12 receiving the input current I_in, which is split into two paths and fed to a switching block 27 that contains switched capacitor circuits SC1 and SC2, and that the output of the switched capacitor circuits SC1 and SC2 is combined at an output node OUT to power a load 18, such as a voltage regulator. A sense resistor Rs1 is connected between the input node IN and the switched capacitor circuit SC1 and a sense resistor Rs2 is connected between the input node IN and the switched capacitor circuit SC2.

As understood by those of skill in the art, the power source 19 includes a rectifying bridge formed by diodes D1-D4 that rectify a current induced in coil L by a time-varying signal and charge a tank capacitor Ct.

As will also be understood by those of skill in the art, the sense resistors Rs1 and Rs2 may be external discrete resistors or may be on-chip resistors located in a spaced apart fashion from the resistors R1-R5 of the current sensor 20. It is known that the resistance of resistors varies over temperature. Thus, the variance of the resistance of the sense resistors Rs1 and Rs2 during operation will be different than that of the resistors R1-R5 because they will be exposed to different temperatures, particularly in the case where the sense resistors Rs1 and Rs2 are external. This may reduce the precision of the current sensor 20. In general, to combat this, the resistors R1-R5 may be precisely matched and/or precisely trimmed so as to help provide a precise known gain from the operational amplifier 24.

This can be costly and add to production time, especially when Rs1 and Rs2 are off-chip as any compensation is performed at module level after the chip has been assembled in its environment. As such, further developments have been made, and will now be discussed. To combat this, the resistors may be on-chip and may be laid out together in a single integrated circuit substrate in a ratiometric layout such that the sense resistors Rs1 and Rs2, and a selected one or ones of the resistors R1-R5 of the current sensor 20, change the same over temperature, while certain other one or ones of the resistors R1-R5 are designed to have a temperature coefficient close to zero and not vary much over temperature, and precise matching of ones of the resistors R1-R5 is not performed. In fact, this concept can be applied to any current sensing application and need not be limited to use in current sensing within switched capacitor DC-DC converters.

Figure 13:
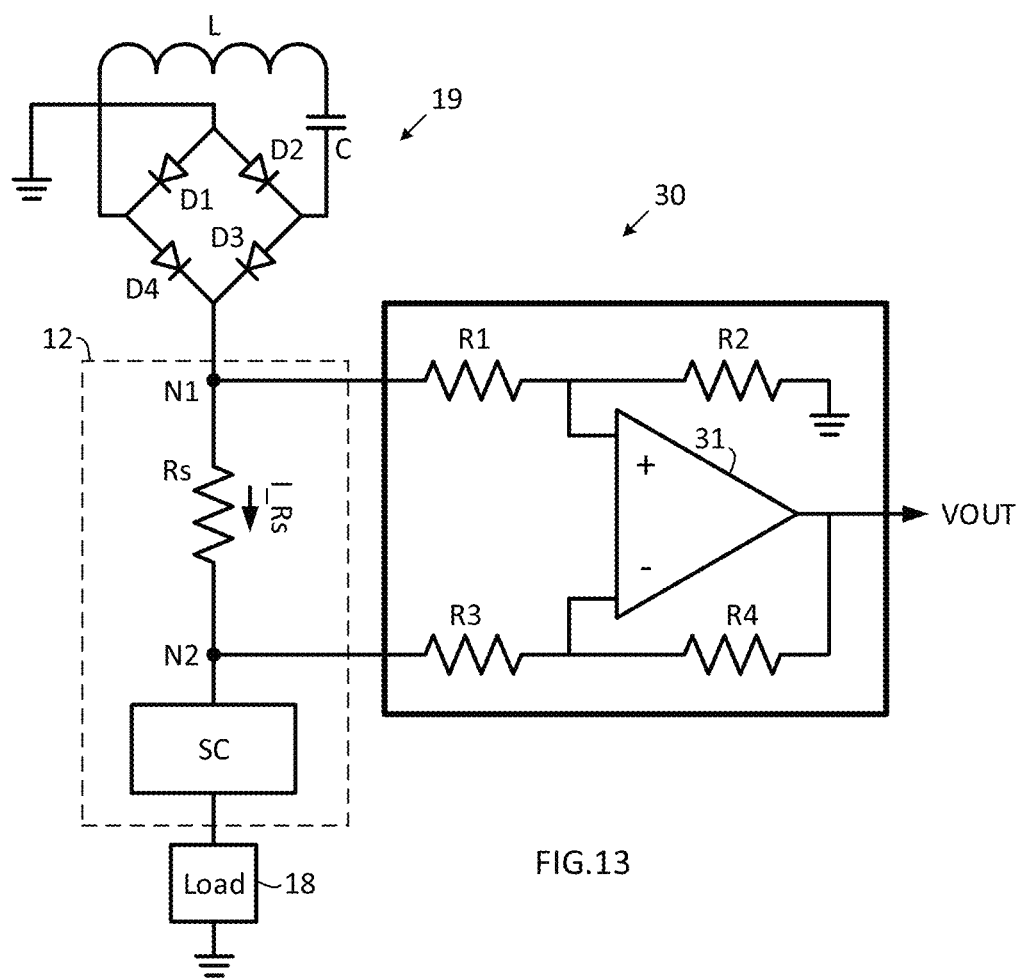
FIG. 13 is a schematic block diagram of a current sensor disclosed herein such as may be used to sense the current through a sense resistor.

For ease of explanation, first consider the simplified example of a circuit including a current sensor 30 shown in FIG. 13. Here, a power source 19 provides an input current to a switched capacitor DC/DC converter 12, the converter including an input sense resistor Rs through which the input current flows (labelled as I_Rs) and a switched capacitor circuit SC, the converter 12 in turn powering a load. The sense resistor Rs is connected between nodes N1 and N2. The current sensor 30 senses the current I_Rs and generates an output voltage VOUT indicative of the current I_Rs. The current sensor 30 includes an operational amplifier 31 having a non-inverting terminal connected to node N1 through resistor R1, with a resistor R2 being connected between the non-inverting terminal and ground. The operational amplifier 31 has an inverting terminal connected to node N2 through resistor R3, with resistor R4 being connected between the inverting terminal and the output of the operational amplifier 31.

The sense resistor Rs is external to the current sensing circuit 30. Therefore, the resistance of the sense resistor Rs and the resistance of the resistors R1 and R2 of the current sensor 30 change differently over temperature, degrading precision of the output voltage VOUT. To combat this, resistors R1, R2, R3, and R4 are matched (for example via trimming) to help ensure a precise gain, with variations in the resistance of the sense resistor Rs over temperature remaining un-compensated. As stated, this can be costly and add to production time, and is therefore undesirable. Other known ways of addressing this issue are also undesirable.

An embodiment of current sensor 40 utilizing a ratiometric layout of its resistors to address these issues is now described with reference to FIG. 14. First, the current sensor 40 will be described, and thereafter the specific substrate-level layout details of the resistors will be described.

The current sensor 40 receives an input current I_Rsense from a power source 19 (illustratively a rectifying bridge), with the current sensing being connected to the power source 19 at node N1. A sense resistor Rsense (e.g., 4 mΩ) is connected between nodes N1 and N2. A regulator 43 receives input from node N2 and provides output to a load 18.

A chopper 41 is coupled between nodes N1/N2 and nodes N3/N4. The chopper 41 includes a switch S1a connected between nodes N2 and N4, and a switch S1b connected between nodes N2 and N3. The chopper 41 also includes a switch S2a connected between nodes N1 and N4, and a switch S2b connected between nodes N1 and N3.

A current source I1 is connected between nodes N3 and N5 and is arranged to sink current from node N3 and source current to node N5. A high voltage p-channel transistor MP1 has its source connected to node N5, its drain connected to node N7, and its gate connected to a collector of PNP transistor Q1. A current source I3 is connected between node N7 and ground, with current source I3 sinking current from node N7 and sourcing current to ground. The PNP transistor Q1 has its collector also connected to a current source I5 which sinks current from the collector of Q1 and sources current to ground. The emitter of PNP transistor Q1 is connected to node N3 and the base of PNP transistor Q1 is connected to node N5.

A current source I2 is connected between nodes N4 and N6 and is arranged to sink current from node N4 and source current to node N6. A high voltage p-channel transistor MP2 has its source connected to node N6, its drain connected to node N8, and its gate connected to a collector of PNP transistor Q2. A current source I4 is connected between node N8 and ground, with current source I4 sinking current from node N8 and sourcing current to ground. The PNP transistor Q2 has its collector also connected to a current source I6 which sinks current from the collector of Q2 and sources current to ground. The emitter of PNP transistor Q2 is connected to node N4 and the base of PNP transistor Q2 is connected to node N6.

A resistor R1 (e.g., 2 kΩ) is connected between nodes N5 and N6.

A differential amplifier 41 has its non-inverting terminal connected to node N8 and its inverting terminal connected to node N7. A resistor R2 (e.g., 50 kΩ) is connected between node N8 and a first output of the amplifier 41, and a resistor R2b (e.g., 50 kΩ) is connected between node N7 and a second output of the amplifier 41. A switch S9a is connected between node N8 and the first output of the amplifier 41, and a switch S9b is connected between node N7 and the second output of the amplifier 41. The outputs of the amplifier 41 are also differential, with a first output voltage VoutP being generated at the first output and a second output voltage VoutN being generates at the second output. An analog to digital converter 42 digitizes the differential signal represented by VoutP and VoutN.

In operation, the voltage across Rsense resulting from the input current I_Rsense is reproduced across the resistor R1, with the high-voltage transistors MP1 and MP2 performing level shifting, and a differential current representative of the input current I_Rense being output by the drains of transistors MP1 and MP2 to the amplifier 41, which converts the differential current to a differential voltage represented by VoutP and VoutN.

The switching sequence of the chopper 41 is shown in FIG. 15. At the beginning of each cycle, as shown, switches S1a and S1b and S9a and S9b are closed while switches S2a and S2b are open, serving to auto-zero the amplifier 41. Thereafter, alternate switching of S1a/S2a and S1b/S2b is performed at the ADC sampling rate, with S1a/S2a being opposite in phase to one another at any given time and S1b/S2b being opposite in phase to one another at any given time.

The gain of the current sensor 40 can be calculated as:

$$\frac{R2}{R1} \times Rsense \times I$$

Notice that if variance in the resistance R1 over temperature is equal to variance in resistance Rsense over temperature, those variances will cancel each other out. As such, it is desired for R1 and Rsense to track one another over temperature. Also, observe that the gain is subject to variations in R2, therefore R2 is designed so as to have a thermal constant as close to zero as possible (e.g., R2 is a poly-resistor) so that the gain of the current sensor 40 can be tuned by trimming R2. One way to yield a zero thermal constant is to divide R2 into two resistors, constructed from materials having opposite temperature coefficients (e.g., divided into a resistor R2_1 having a temperature coefficient of +1% and a resistor R2_2 having a temperature coefficient of −1%). As an alternative to using a resistor R2, a 1/sC switched capacitance with extremely low temperature dependency governed by C and using an available stable switching frequency may be used.

Figure 16:
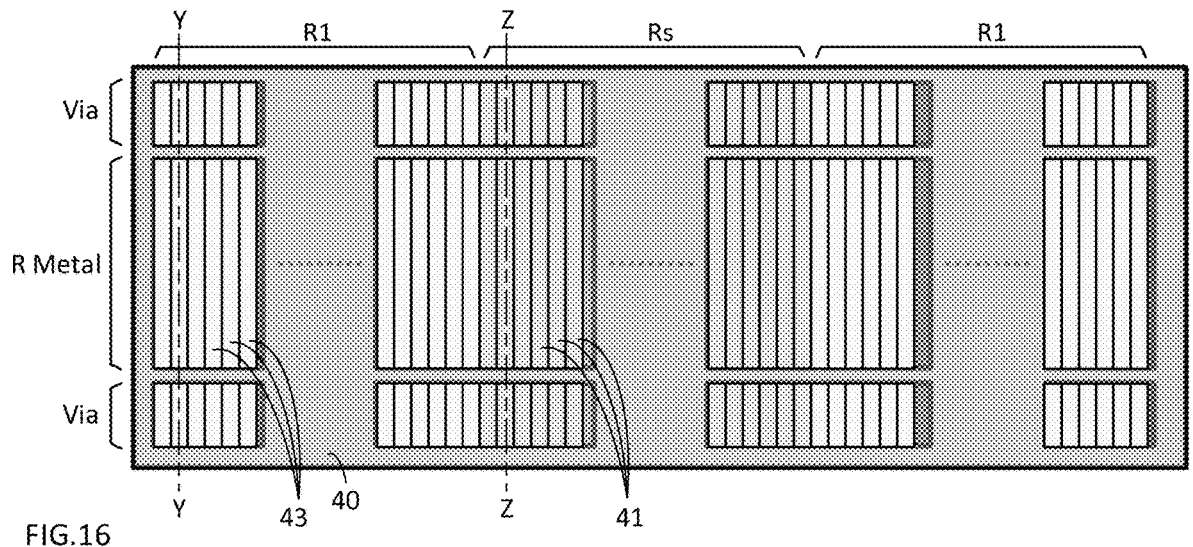
FIG. 16 is a top plan view showing on-silicon formation of the resistors R1 and Rs of the current sensor of FIG. 14.

A top plan view of the resistors R1 and Rs as formed on an integrated circuit substrate 40 is illustrated in FIG. 16. Rs is formed by multiple "elementary" resistor structures connected in parallel, while R1 is formed by multiple "elementary" resistor structures connected in series. The elementary resistor structures are multi-layer, and as can be observed in FIG. 16, the elementary resistor structures forming the sense resistor Rs are surrounded on two sides by the elementary resistor structures forming the resistor R1, such that Rs and R1 will heat and cool during operation to substantially the same temperature, at substantially the same rate.

Figure 17:
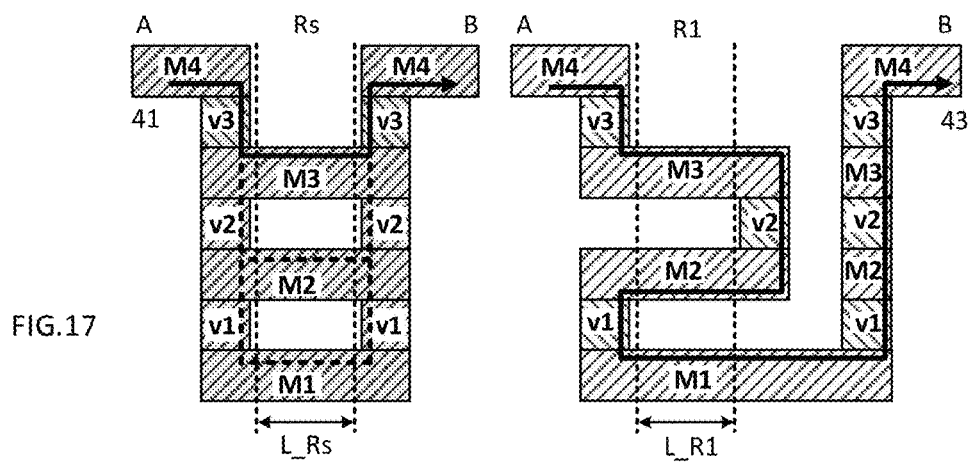
FIG. 17 is a cross sectional view of a first possible configuration for the elementary resistor units of R1 and Rs shown in FIG. 16 taken along the lines Y-Y and Z-Z.

In a first possible implementation shown in the cross section of FIG. 17 (which is a cross sectional view of the top plan view of FIG. 16 taken along lines Y-Y and Z-Z), the elementary resistor structures 41 and 43 forming R1 and Rs can be implemented from parallel metal sheets, where the length L_Rs of the metal sheets used to form the stackup of Rs is generally equal to the length L_R1 of the metal sheets used to form the stackup of R1, and assuming the width W_Rs of the metal sheets used to form the stackup of Rs is generally equal to the width W_R1 of the metal sheets used to form the stackup of R1, and taking note that the resistance of the vias connecting the respective metal sheets of R1 and Rs is small but not negligible compared to that of the metal sheets (e.g., a few % of the resistance of the metal sheets), where the number of vias connecting the respective metal sheets of R1 and Rs are equal or as equal as possible.

To form the elementary resistor structures 41 used to form sense resistor Rs, as shown in FIG. 17, parallel metal sheets M1, M2, M3 that are equal in length, width, and thickness are connected to one another by vias (electrically connected in parallel), with metal sheet M1 being connected to metal sheet M2 at opposite sides by vias v1, and with metal sheet M2 being connected to metal sheet M3 at opposite sides by vias v2. In elementary resistor structures 41 not at the outer periphery or inner periphery (inner periphery being where a resistor structure 41 of the resistor R1 faces a resistor structure of the resistor Rs), terminals are formed by a pair of metal sheets M4 and connected to opposite ends of metal sheet M3 by vias v3, and these terminals M4 are connected to metal sheets M3 of adjacent resistor structures 41 by vias v3. Where an elementary resistor structure 41 is at the inner or outer periphery, it lacks the metal sheet M4 and via v3 at its side facing the inner or outer periphery.

The resulting resistance of the resistor Rs is:

$$Rs = \frac{1}{1/R_{M1} + 1/R_{M2} + 1/R_{M3}}$$

A desired number of such elementary resistor structures 41 are connected in parallel to yield the desired resistance of R1.

To form the elementary resistor structures 43 used to form resistor R1, as shown in FIG. 17, parallel metal sheets M1, M2, and M3 are connected to one another by vias (electrically connected in series). Here, metal sheets M2 and M3 are each divided into two pieces, referred to herein as left and right pieces of ease of reading FIG. 17, with the left pieces of M2 and M3 being equal in length, width, and thickness, the right pieces of M2 and M3 being equal in length, width and thickness. Metal sheet M1 is a single unitary metal sheet being negligibly greater in length than the combined length of left and right sheets M2 and the combined length of left and right M3. Metal sheet M1 is connected at one end to the left-side metal sheet M2 by a via v1 and is connected at its other end to the right-side metal sheet M2 by a via v1. Left side metal sheet M2 is connected to left side metal sheet M3 by a via v2 located at the opposite side of M2 as the via v1. Left side metal sheet M3 is connected to the left metal sheet M4 by a via v3, with the via v3 being located at the opposite side of M3 as the via v2. Right side metal sheet M2 is connected to right side metal sheet M3 by a via v2, and right side metal sheet M3 is connected to the right metal sheet M4 by a via v3.

The resulting resistance of the resistor R1 is:

$$R1 = R_{M1} + R_{M2} + R_{M3}$$

A desired number of such elementary resistor structures 43 are connected in series to yield the desired resistance of RS.

The structure proposed in FIG. 17 is advantageous for designing very low Rs and high R1 values within a small silicon area, as it benefits of the parallelism of the metals M1, M2, M3 in Rs and the serialization of M1, M2, M3 in R1. However, it can also be observed on structure 41 that given that the terminations are in metal M4, the current circulating from node A to node B within the elementary Rs may not distribute uniformly across M3, M2, M1 due to the via v2 and via v1 which are along the path. By construction of the series structure R1, a uniform current flows in M1, M2, M3. Therefore, Rs and R1 may suffer of unexpected matching as the part of contribution of M1, M2, M3 are even in R1 while M1 and M2 have a lesser contribution than in Rs, resulting in a relative higher contribution of M3. As the three metal layers M1, M2, M3 may behave differently, the structure proposed on FIG. 17 is not optimized against temperature effects, but presents a good trade-off for small areas.

Figure 18:
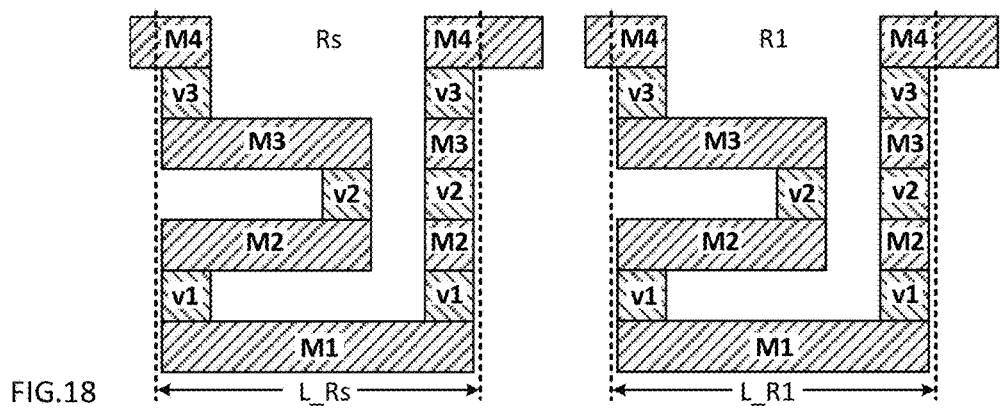
FIG. 18 is a cross sectional view of a second possible configuration for the elementary resistor units of R1 and Rs shown in FIG. 16 taken along the lines Y-Y and Z-Z.

In a second possible implementation shown in the cross section of FIG. 18 (which is also a cross sectional view of the top plan view of FIG. 16 taken along lines Y-Y and Z-Z), the elementary resistor structures 41 and 43 forming Rs and R1 can have the same structure, with the difference in resistance between R1 and Rs being in how many of the elementary resistor structures 41 and 43 are used to form each.

Here, to form the elementary resistor structures 43 used to form resistor R1, as shown in FIG. 18, parallel metal sheets M1, M2, and M3 are connected to one another by vias (electrically connected in series). Here, metal sheets M2 and M3 are each divided into two pieces, referred to herein as left and right pieces of ease of reading FIG. 17, with the left pieces of M2 and M3 being equal in length, width, and thickness, the right pieces of M2 and M3 being equal in length, width and thickness. Metal sheet M1 is a single unitary metal sheet being negligibly greater in length than the combined length of left and right sheets M2 and the combined length of left and right M3. Metal sheet M1 is connected at one end to the left-side metal sheet M2 by a via v1 and is connected at its other end to the right-side metal sheet M2 by a via v1. Left side metal sheet M2 is connected to left side metal sheet M3 by a via v2 located at the opposite side of M2 as the via v1. Left side metal sheet M3 is connected to the left metal sheet M4 by a via v3, with the via v3 being located at the opposite side of M3 as the via v2. Right side metal sheet M2 is connected to right side metal sheet M3 by a via v2, and right side metal sheet M3 is connected to the right metal sheet M4 by a via v3.

The resulting resistance of the resistor R1 is:

$$R1 = R_{M1} + R_{M2} + R_{M3}$$

To form the elementary resistor structures 41 used to form resistor Rs, as shown in FIG. 18, parallel metal sheets M1, M2, and M3 are connected to one another by vias (electrically connected in series). Here, metal sheets M2 and M3 are each divided into two pieces, referred to herein as left and right pieces of ease of reading FIG. 18, with the left pieces of M2 and M3 being equal in length, width, and thickness, the right pieces of M2 and M3 being equal in length, width and thickness. Metal sheet M1 is a single unitary metal sheet being negligibly greater in length than the combined length of left and right sheets M2 and the combined length of left and right M3. Metal sheet M1 is connected at one end to the left-side metal sheet M2 by a via v1 and is connected at its other end to the right-side metal sheet M2 by a via v1. Left side metal sheet M2 is connected to left side metal sheet M3 by a via v2 located at the opposite side of M2 as the via v1. Left side metal sheet M3 is connected to the left metal sheet M4 by a via v3, with the via v3 being located at the opposite side of M3 as the via v2. Right side metal sheet M2 is connected to right side metal sheet M3 by a via v2, and right side metal sheet M3 is connected to the right metal sheet M4 by a via v3.

The resulting resistance of the resistor Rs is:

$$Rs = R_{M1} + R_{M2} + R_{M3}$$

A desired number of such elementary resistor structures 43 and 41 are connected in parallel and in series to yield the desired resistance of R1 and RS.

The structure proposed in FIG. 18 is advantageous as it provides that a similar elementary module is used for building the resistances Rs and R1 and it allows achievement of the best possible matching against temperature effects. However due to serialization of elements M1, M2, and M3 in Rs, the area for outing a low value Rs may be significantly higher than the previous Rs utilizing the topology of FIG. 17.

Figure 19:
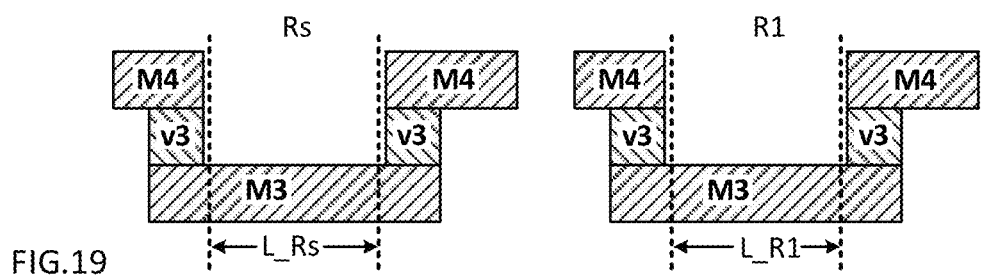
FIG. 19 is a cross sectional view of a third possible configuration for the elementary resistor units of R1 and Rs shown in FIG. 16 taken along the line Y-Y and Z-Z.
Figure 20:
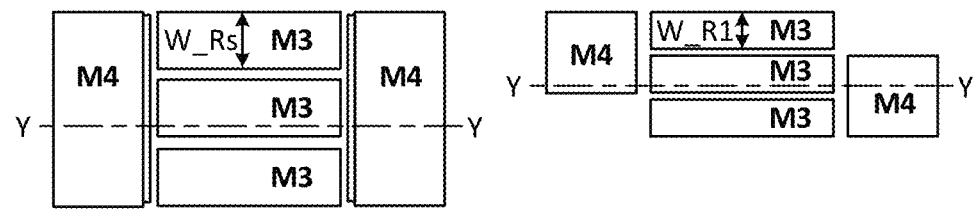
FIG. 20 is an enlarged top plan view showing on-silicon formation of the resistors R1 and Rs of the current sensor of FIG. 15 when utilizing the configuration of FIG. 19.

In a third possible implementation shown in the cross section of FIG. 19 (which is also a cross sectional view of the top plan view of FIG. 16 taken along lines Y-Y and Z-Z, and of the enlarged top plan view of FIG. 20 taken along line Y-Y), the metal layers M3 of the elementary resistor structures 41 and 43 forming Rs and R1 can have the same structure in terms of length and thickness, but with the width of the elementary resistor structures 43 forming R1 having a greater width than that of the elementary resistor structures R1 forming Rs, as may be observed in the enlarged top plan view of FIG. 20.

In the elementary resistor structure 41 forming Rs in this example, metal sheet M3 is connected at its ends to left and right metal sheets M4 by vias v3, and multiple such formed elementary resistor structures 41 are connected in parallel by the sharing of the metal sheets M4 by their metal sheets M3.

In the elementary resistor structure 43 forming R1 in this example, a given metal sheet M3 is connected at its ends to left and right metal sheets M4 by vias v3, and multiple such formed elementary resistor structures 43 are connected in series by sharing of certain ones of the metal sheets M4 by their metal sheets M3. For example, in the top plan view of R1 shown in FIG. 20, the central elementary resistor structure 43 shares its right side M4 with the M3 of bottom elementary resistor structure 43 and shares its left side M4 with the M3 of the top elementary resistor structure 43, forming a snake-shaped structure to connect the elementary resistor structures 43 in series.

This third implementation, like the first and second implementations, is quite useful, although it should be understood that the unequal widths may result in a slight gain error (which can be corrected for by trimming R2). Also understand that it is possible to use elementary resistor units 43 and 41 for both Rs and R1 having the same width, but with the number of such elementary resistor units 43 used for R1 being increased to therefore meet the desired resistance. It is to be noted that this third implementation has advantage of making it possible to use some relatively reasonable silicon area as Rs can be tuned to be a low value thanks to the larger W_Rs, while a high resistance value can still be achieved with R1 thanks to a small W_R1 and serialization. This structure allows a similar flow of the current as it uses one level of metal and the vertical stack up is exactly similar in Rs and R1, also offering a best possible matching against temperature effects. The flexibility to combine the advantages of the structures of FIG. 17 and FIG. 18 comes at the expense of the absolute systematic matching between Rs and R1 as highlighted above. However, this is a minor penalty to pay as the gain can be easily adjusted in production at chip level.

Figure 21:
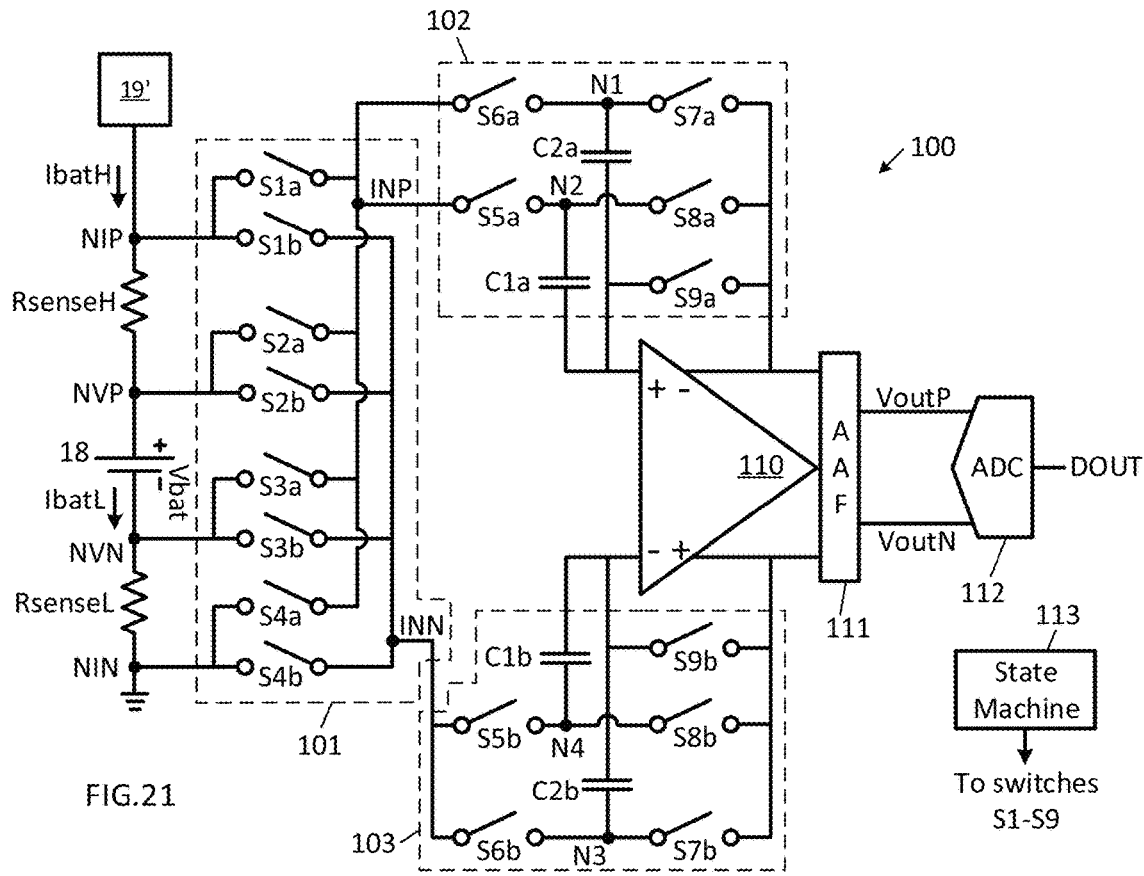
FIG. 21 is a schematic diagram of a configurable voltage/current sensor disclosed herein such as may be used to sense battery voltage, high-side battery current, and low-side battery current, and its connection to an overall wireless charging system.

Now described with reference to FIG. 21 is another embodiment of a voltage/current sensor 100 for use in sensing load voltage and load current. Here, the load 18 is a battery that receives an input current from a power source 19' (which may be the power source 19' shown in FIG. 12, and in particular may be the output of the power converter 27, but may instead be the output of a rectifying bridge).

The battery 18 is coupled to the power source 19' through a high-side sense resistor RsenseH, and is coupled to ground through a low-side sense resistor RsenseL. The node between the power source and the high-sense resistor RsenseH is denoted as NIP, the node between the high-side sense resistor RsenseH and the battery 18 is denoted as NVP, the node between the battery 18 and the low-side sense resistor RsenseL is denoted as NVN, and the node between the low-side sense resistor RsenseL and ground is denoted as NIN.

An input multiplexer 101 has inputs connected to nodes NIP, NVP, NVN, and NIN, and outputs connected to nodes INP and INN. The input multiplexer 101 includes switch S1a connected between nodes NIP and INP, switch S2a connected between nodes NVP and INP, switch S3a connected between nodes NVN and INP, and switch S4a connected between nodes NIN and INN. The input multiplexer 101 also includes switch S1b connected between nodes NIP and INN, switch S2b connected between nodes NVP and INN, switch S3b connected between nodes NVN and INN, and switch S4b connected between nodes MN and INN.

A first programmable gain circuit 102 has an input connected to node INP, and outputs connected to the non-inverting input terminal of double-ended differential amplifier 110 and to the inverting output terminal of the double ended differential amplifier 110. The first programmable gain circuit 102 includes switch S6a connected between nodes INP and N1, switch S5a connected between nodes INP and N2, switch S7a connected between node N1 and the inverting output terminal of the differential amplifier 110, switch S8a connected between node N2 and the inverting output terminal of the differential amplifier 110, and switch S9a connected between the non-inverting input terminal and inverting output terminal of the differential amplifier 110. Capacitor C1a is connected between node N2 and the non-inverting input terminal of the differential amplifier 110, and capacitor C2a is connected between node N1 and the non-inverting input terminal of the differential amplifier 110.

A second programmable gain circuit 103 has an input connected to node INN, and outputs connected to the inverting input terminal of double-ended differential amplifier 110 and to the non-inverting output terminal of the double ended differential amplifier 110. The second programmable gain circuit 103 includes switch S6b connected between nodes INN and N3, switch S5b connected between nodes INN and N4, switch S7b connected between node N3 and the non-inverting output terminal of the differential amplifier 110, switch S8b connected between node N4 and the non-inverting output terminal of the differential amplifier 110, and switch S9b connected between the inverting input terminal and non-inverting output terminal of the differential amplifier 110. Capacitor C1b is connected between node N4 and the inverting input terminal of the differential amplifier 110, and capacitor C2b is connected between node N3 and the inverting input terminal of the differential amplifier 110.

An anti-aliasing filter 111 is connected to the inverting and non-inverting output terminals of the double-ended differential amplifier 110 and filters the signals therefrom to produce differential output voltages VoutP and VoutN, which are sampled by analog to digital converter 112 to produce a digital output DOUT that can be representative of the voltage Vbat across the battery 18, the high-side current IbatH into the battery 18, or the low-side current IbatL out of the battery 18 to ground, dependent upon mode. The digital output DOUT may be digital processed and read.

A state machine 113 controls the operation of the switches S1a-S9a, and Slb-S9b.

Figure 22A:
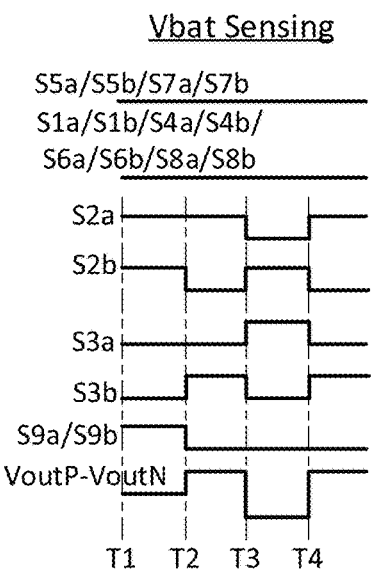
FIG. 22A is a timing diagram showing the switches and differential input voltage of the configurable voltage/current sensor of FIG. 21 when sensing battery voltage.

Operation of the voltage/current sensor to perform battery 18 voltage Vbat sensing is now described with additional reference to FIG. 22A. To perform battery voltage Vbat sensing, the state machine 113 closes switches S5a, S5b, S7a, and S7b, and opens switches S1a, S2b, S4a, S4b, S6a, S6b, S8a, and S8b.

At time T1, switches S2a, S2b, S9a, and S9b are closed, thereby connecting node NVP to the capacitor C1a as well as to capacitor C1b. Capacitors C1a and C1b have the same capacitance values, and therefore between times T1 and T2, the same input is applied to both input terminals of the differential amplifier 110, while the closing of switches S9a and S9b shorts the inputs of the differential amplifier 110 to the outputs of the differential amplifier 110, thereby performing an auto-zero operation. This auto-zeroing phase occurring between times T1 and T2 may last 10 μs, for example. Note that the auto-zeroing operation could instead have been performed by applying any two identical voltages to the inputs of the differential amplifier 110.

At time T2, switches S2b, S9a, and S9b open, while switch S3b closes, and switches S2a and S3a do not change state. This connects node NVP to the capacitor C1a, and connects node NVN to capacitor C1b. Therefore, here, capacitors C1a and C1b serve as the input capacitors, and the maintaining of the switches S7a and S7b as closed causes capacitors C2a and C2b to serve as the feedback capacitors. Measurement of the voltage Vbat across the battery 18, with a gain of C1a/C2a (or C1b/C2b, being that C1a and C1b have equal capacitances and C2a and C2b have equal capacitances). As an example, assuming that C2a has a value of 5 times that of C1a, the gain used by the differential amplifier 110 during battery voltage measurement is ⅕. As can be observed in FIG. 22A, the differential output VoutP-VoutN provided by the differential amplifier 110 rises from ground at time T1 to a value above one between times T2 and T3. This first measurement may last 20 μs, for example.

Chopping is then begun at time T3, in which switches S2b and S3a close and switches S2a and S3b open, while switches S9a and S9b do not change state. This connects node NVP to capacitor C1b and connects node NVN to capacitor C1a. This has the effect of inverting the differential output VoutP-VoutN a first time. Chopping continues at time T4, in which switches S2a and S3b close while switches S2b and S3a open, with the remainder of the switches not changing state. This returns the switches to the state they were between times T2 and T3, with the differential output VoutP-VoutN then being inverted once again.

The purpose of the chopping is to shift the signal in the frequency domain for ultimately rejecting amplifier's noise at de-chopping. These chopping phases may each last 20 μs, for example. Although two chopping phases are shown, additional chopping phases may be performed, such as to provide for one measurement phase and fifteen chopping phases, which collectively define one acquisition cycle. The acquisition cycle may be repeated for improving sensing accuracy, for example by digital averaging or filtering performed on the output DOUT of the ADC 112. De-chopping is also performed at this stage to reconstruct the value of the battery voltage Vbat in the digital domain.

Figure 22B:
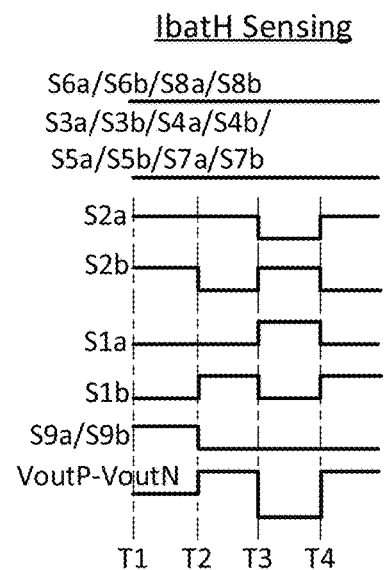
FIG. 22B is a timing diagram showing the switches and differential input voltage of the configurable voltage/current sensor of FIG. 21 when sensing high-side battery current.

Operation of the voltage/current sensor to perform high-side current IbatH sensing is now described with additional reference to FIG. 22B. To perform high-side current IbatH sensing, the state machine 113 closes switches S6a, S6b, S8a, and S8b, and opens switches S3a, S3b, S4a, S4b, S5a, S5b, S7a, and S7b.

At time T1, switches S2a, S2b, S9a, and S9b are closed, thereby connecting node NVP to the capacitor C2a as well as to capacitor C2b. Capacitors C2a and C2b have the same capacitance values, and therefore between times T1 and T2, the same input is applied to both input terminals of the differential amplifier 110, while the closing of switches S9a and S9b shorts the inputs of the differential amplifier 110 to the outputs of the differential amplifier 110, thereby performing an auto-zero operation. Note that the auto-zeroing operation could instead have been performed by applying any two identical voltages to the inputs of the differential amplifier 110.

At time T2, switches S2b, S9a, and S9b open, while switch S1b closes, and switches S2a and S1a do not change state. This connects the voltage at node NIP to capacitor C2b, and connects the voltage at node NVP to capacitor C2a. Therefore, the differential amplifier 110 at this phase is sensing the voltage drop across the high-side sense resistor RsenseH, which is representative of the high-side current IbatH. Here, the capacitors C2a and C2b serve as the input capacitors while the capacitors C1a and C1b serve as the feedback capacitors. Thus here, assuming that capacitors C2a, C2b have capacitance values that are five times that of capacitors C1a, C1b, the gain is 5.

Chopping is then begun at time T3, at which switches S2a and S1b open, while switches S2b and S1a close and the remainder of the switches maintain state. This connects the node NVP to the capacitor C2b and connects the node NIP to the capacitor C2a. This has the effect of inverting the differential output VoutP-VoutN a first time.

Chopping continues at time T4, in which switches S2b and S1a open while switches S2a and S1b close, with the remainder of the switches not changing state. This returns the switches to the state they were between times T2 and T3, with the differential output VoutP-VoutN then being inverted once again. Although two chopping phases are shown, additional chopping phases may be performed, such as to provide for one measurement phase and fifteen chopping phases, which collectively define one acquisition cycle. The acquisition cycle may be repeated for improving sensing accuracy, for example by digital averaging or filtering performed on the output DOUT of the ADC 112. De-chopping is performed to reconstruct the value of the high-side current IbatH in the digital domain.

Figure 22C:
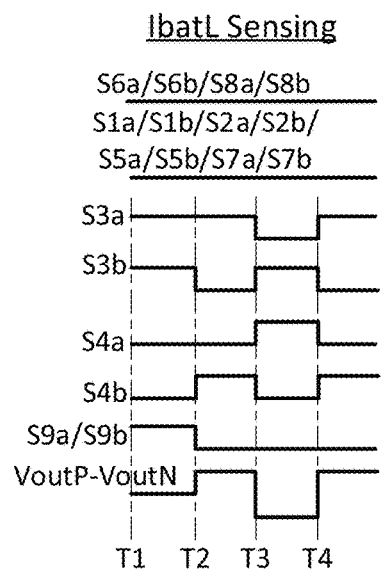
FIG. 22C is a timing diagram showing the switches and differential input voltage of the configurable voltage/current sensor of FIG. 21 when sensing low-side battery current.

Operation of the voltage/current sensor to perform low-side current IbatL sensing is now described with additional reference to FIG. 22C. To perform low-side current IbatL sensing, the state machine 113 closes switches S6a, S6b, S8a, and S8b, and opens switches S1a, S1b, S2a, S2b, S5a, S5b, S7a, and S7b.

At time T1, switches S3a, S3b, S9a, and S9b are closed, thereby connecting node NVN to the capacitor C2a as well as to capacitor C2b. Capacitors C2a and C2b have the same capacitance values, and therefore between times T1 and T2, the same input is applied to both input terminals of the differential amplifier 110, while the closing of switches S9a and S9b shorts the inputs of the differential amplifier 110 to the outputs of the differential amplifier 110, thereby performing an auto-zero operation. Note that the auto-zeroing operation could instead have been performed by applying any two identical voltages to the inputs of the differential amplifier 110.

At time T2, switches S3b, S9a, and S9b open, while switch S4b closes, and switches S3a and S4a do not change state. This connects the voltage at node MN to capacitor C2b, and connects the voltage at node NVN to capacitor C2a. Therefore, the differential amplifier 110 at this phase is sensing the voltage drop across the low-side sense resistor RsenseL, which is representative of the low-side current IbatL. Here, the capacitors C2a and C2b serve as the input capacitors while the capacitors C1a and C1b serve as the feedback capacitors. Thus here, assuming that capacitors C2a, C2b have capacitance values that are five times that of capacitors C1a, C1b, the gain is 5.

Chopping is then begun at time T3, at which switches S3a and S4b open, while switches S3b and S4a close and the remainder of the switches maintain state. This connects the node NVN to the capacitor C2b and connects the node MN to the capacitor C2a. This has the effect of inverting the differential output VoutP-VoutN a first time. Chopping continues at time T4, in which switches S3b and S4a open while switches S3a and S4b close, with the remainder of the switches not changing state. This returns the switches to the state they were between times T2 and T3, with the differential output VoutP-VoutN then being inverted once again. Although two chopping phases are shown, additional chopping phases may be performed, such as to provide for one measurement phase and fifteen chopping phases, which collectively define one acquisition cycle. The acquisition cycle may be repeated for improving sensing accuracy, for example by digital averaging or filtering performed on the output DOUT of the ADC 112. De-chopping is performed to reconstruct the value of the low-side current IbatL in the digital domain.

As can be observed from the above description of the above battery voltage Vbat, high-side current IbatH, and low-side current IbatL measurement modes, which capacitor C1a, C1b or C2a, C2b is used as the input capacitor which capacitor C1a, C1b or C2a, C2b is used as the feedback capacitor can be selected. Therefore, through the operation of the programmable gain circuits 102 and 103, the gain for any given sensing phase can be selected.

Figure 23:
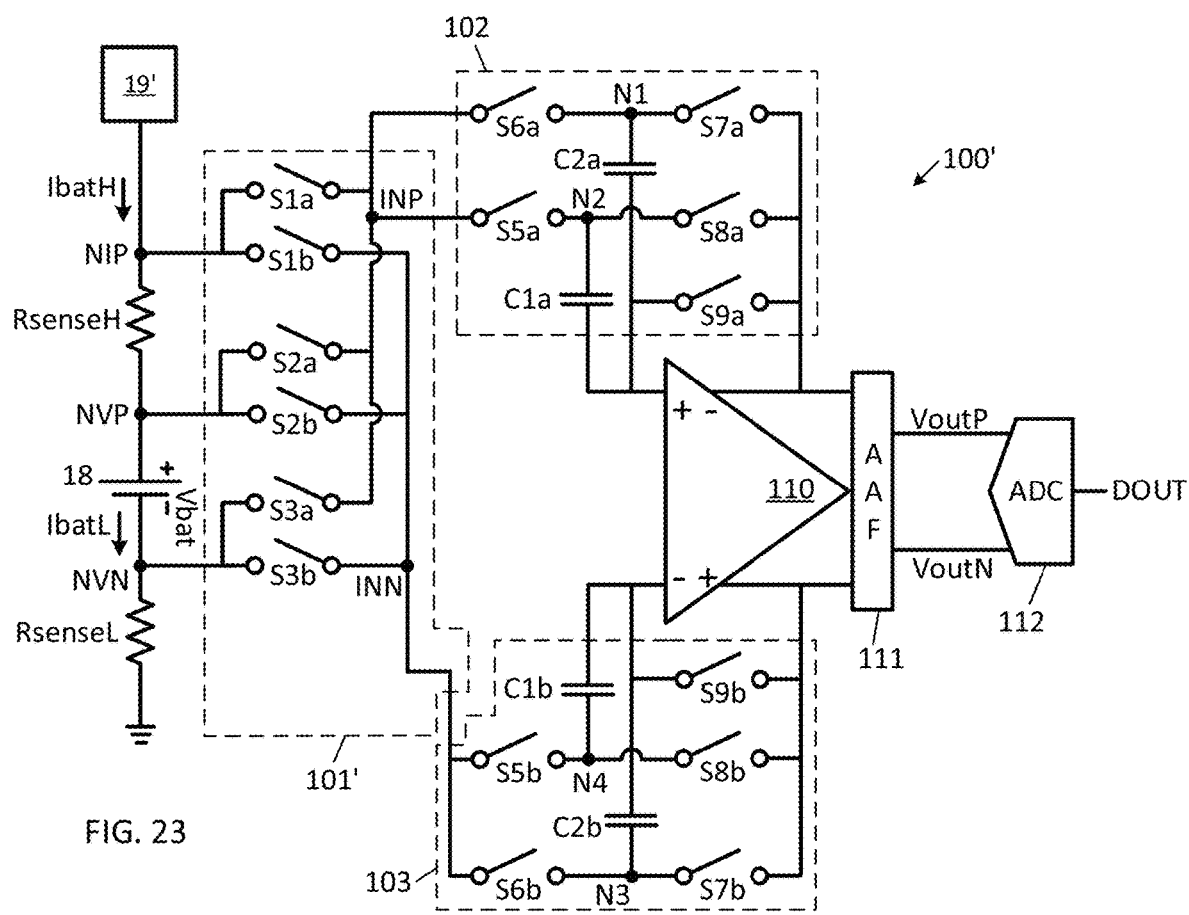
FIG. 23 is a schematic diagram of a second embodiment of a configurable voltage/current sensor disclosed herein such as may be used to sense battery voltage, high-side battery current, and low-side battery current, and its connection to an overall wireless charging system.

In some applications, low-side current IbatL sensing may not be desired. In such cases, such as that shown in FIG. 23, the input multiplexer 101' is modified to remove the switched S4a and S4b. Otherwise, the voltage/current sensor 100' of FIG. 23 remains the same as that of FIG. 21.

Figure 24:
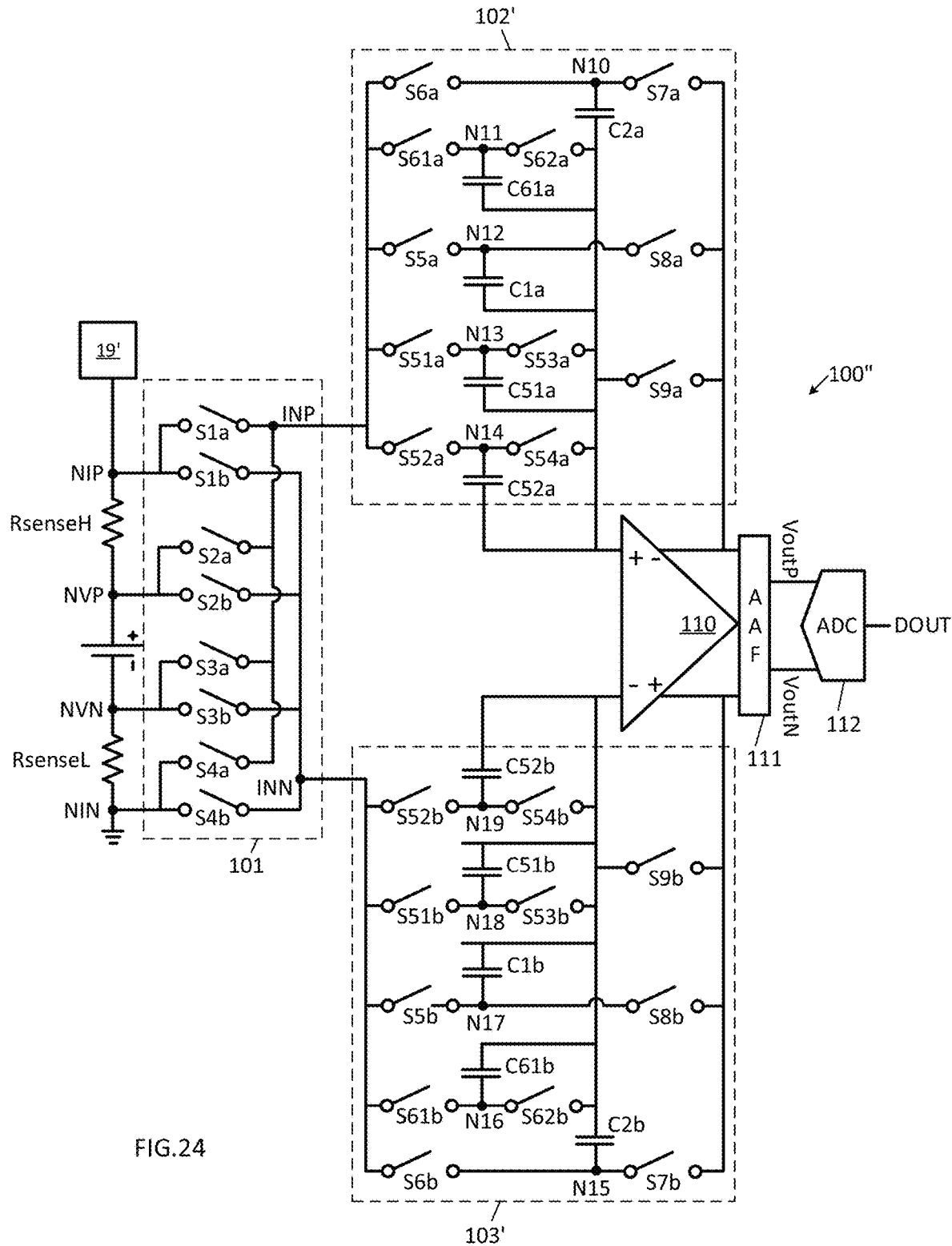
FIG. 24 is a schematic diagram of a third embodiment of a configurable voltage/current sensor disclosed herein such as may be used to sense battery voltage, high-side battery current, and low-side battery current, and its connection to an overall wireless charging system.

Now described with reference to FIG. 24 is an embodiment of a voltage/current sensor 100" permitting for a wider range of programmable gains. Here, as compared to the voltage/current sensor 100" of FIG. 21, the power source 19', input multiplexer 101, and double-ended differential amplifier 110 remain the same, but the first programmable gain circuit 102' and second programmable gain circuit 103' are modified.

The first programmable gain circuit 102' has an input connected to node INP, and outputs connected to the non-inverting input terminal of double-ended differential amplifier 110 and to the inverting output terminal of the double ended differential amplifier 110. The first programmable gain circuit 102' includes switch S6a connected between nodes INP and N10, switch S7a connected between node N10 and the inverting output terminal of differential amplifier 110, switch S61a connected between nodes INP and N11, switch S62a connected between node N11 and the non-inverting input terminal of differential amplifier 110, switch S5a connected between nodes INP and N12, switch S8a connected between node N12 and the inverting output terminal of differential amplifier 110, switch S51a connected between nodes INP and N13, switch S53a connected between node N13 and the non-inverting input terminal of differential amplifier 110, switch S9a connected between the non-inverting input terminal of differential amplifier 110 and the inverting output terminal of differential amplifier 110, switch S52a connected between nodes INP and N14, and switch S54a connected between node N14 and the non-inverting input terminal of the differential amplifier 110.

The second programmable gain circuit 103' has an input connected to node INN, and outputs connected to the inverting input terminal of double-ended differential amplifier 110 and to the non-inverting output terminal of the double ended differential amplifier 110. The second programmable gain circuit 103' includes switch S6b connected between nodes INN and N15, switch S7b connected between node N15 and the non-inverting output terminal of differential amplifier 110, switch S61b connected between nodes INN and N16, switch S62b connected between node N16 and the inverting input terminal of differential amplifier 110, switch S5b connected between nodes INN and N17, switch S8b connected between node N17 and the non-inverting output terminal of differential amplifier 110, switch S51b connected between nodes INN and N18, switch S53b connected between nodes N18 and the inverting input terminal of differential amplifier 110, switch S9b connected between the inverting input terminal of differential amplifier 110 and the non-inverting output terminal of differential amplifier 110, switch S52b connected between nodes INN and N19, and switch S54b connected between node N19 and the inverting input terminal of the differential amplifier 110.

Capacitor C2a is connected between node N10 and the non-inverting input terminal of the differential amplifier 110, capacitor C61a is connected between node N11 and the non-inverting input terminal of the differential amplifier 110, capacitor C1a is connected between node N12 and the non-inverting input terminal of the differential amplifier 110, capacitor C51a is connected between node N13 and the non-inverting input terminal of the differential amplifier 110, and capacitor C52a is connected between node N14 and the non-inverting input terminal of the differential amplifier 110.

Capacitor C2b is connected between node N15 and the inverting input terminal of the differential amplifier 110, capacitor C61b is connected between node N16 and the inverting input terminal of the differential amplifier 110, capacitor C1b is connected between node N17 and the inverting input terminal of the differential amplifier 110, capacitor C51b is connected between node N18 and the inverting input terminal of the differential amplifier 110, and capacitor C52b is connected between node N19 and the inverting input terminal of the differential amplifier 110.

Operation proceeds the same as described above with respect to FIG. 24, except here the programmable gain circuits 102' and 103' permit selection from among capacitors C2a, C2b, C61a, C61b, C1a, C1b, C51a, C51b, C52a, C52b as the input capacitors and feedback capacitors. Here, capacitors C2a and C61a may have capacitance values that are five times that of capacitor C1a, capacitor C51a may have a capacitance value that is 0.5 that of capacitor C1a, and capacitor C52a may have a capacitance value that is 0.25 that of capacitor C1a. Similarly, capacitors C2b and C61b may have capacitance values that are five times that of capacitor C1b, capacitor C51b may have a capacitance value that is 0.5 that of capacitor C1b, and capacitor C52b may have a capacitance value that is 0.25 that of capacitor C1b. Thus, here, gain can range from 1/40 (with capacitors C52a and C52b serving as the input capacitors and capacitors C2a/C61a and C2b/C61b connected in parallel and serving as the feedback capacitors) to 40 (with capacitors C2a/C61a and C2b/C61b connected in parallel and serving as the input capacitors, and capacitors C52a and C52b serving as the feedback capacitors).

The voltage/current sensors 100, 100', and 100" described herein with programmable gains have a variety of advantages. They utilize input capacitors, thereby blocking offset DC currents. Moreover, the capacitors utilized may be MOM (metal-oxide-metal) capacitors, providing resistance to piezoelectric effects caused by mechanical stressed. Still further, the use of auto-zeroing and chopping serve to cancel noise and residual offset effects, and provide insensitivity to the common-mode of the measured signal.

Figure 25:
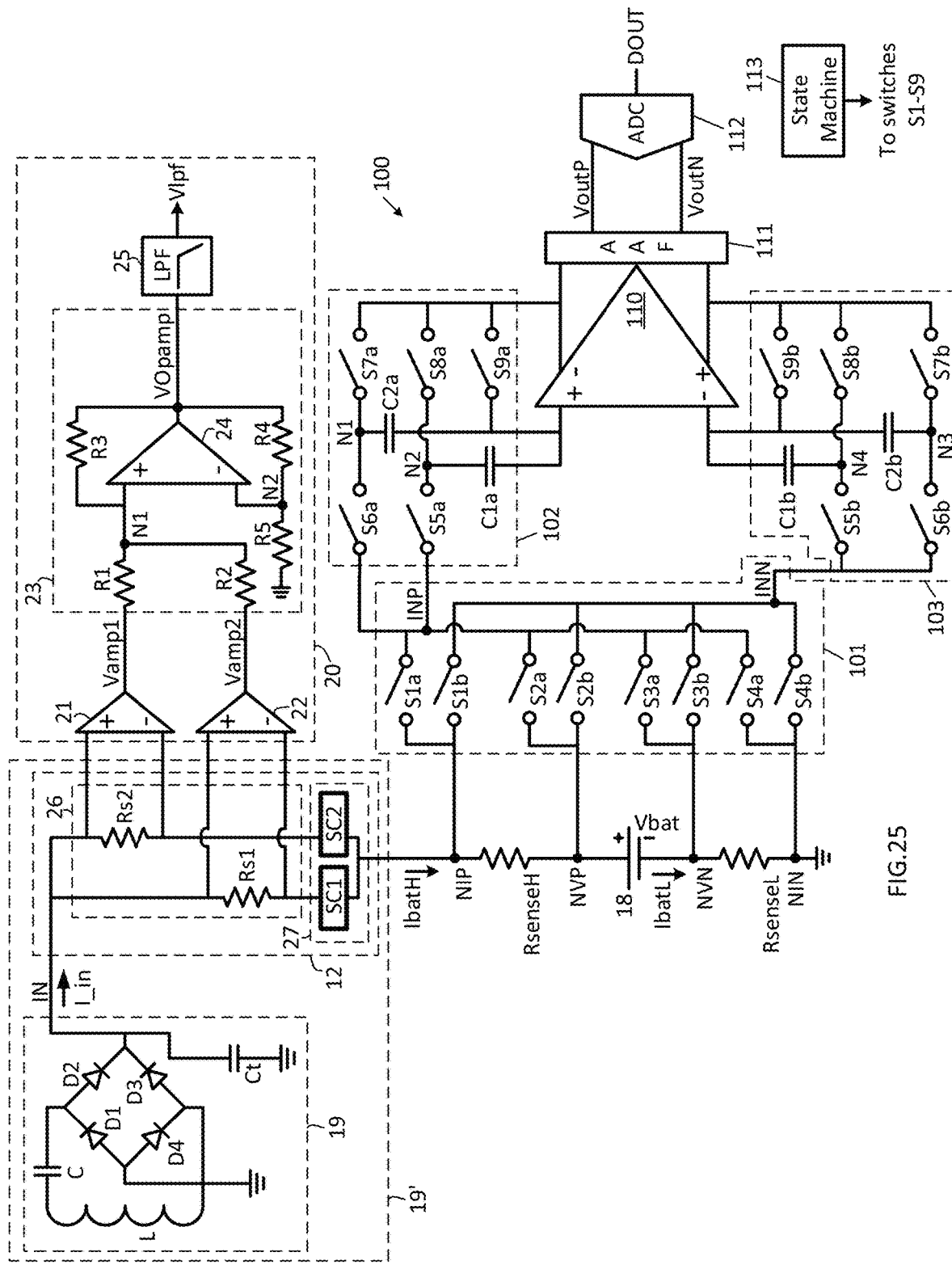
FIG. 25 is a schematic diagram of a configurable voltage/current sensor disclosed herein similar to that of FIG. 1 such as may be used to sense battery voltage, high-side battery current, and low-side battery current, and its connection to an overall wireless charging system that also performs power source current sensing.

Finally, it is clear that modifications and variations may be made to what has been described and illustrated herein, without thereby departing from the scope of this disclosure, as defined in the annexed claims. For example, shown in FIG. 25 is an embodiment of the sensor 100 utilizing the power source 19' of FIG. 21, as well as the remainder of the circuitry of FIG. 21 to provide for sensing of the current immediately after the rectifying bridge 19 as well as the battery voltage/current sensing described above.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A current sensor, comprising:
   a sense resistor coupled to receive an input current from a power source, wherein the sense resistor is formed from a plurality of connected elementary sense resistor units, wherein each of the plurality of connected elementary sense resistor units comprises a plurality of parallel metal sheets electrically connected in parallel to one another by vias; and
   an amplification circuit having:
      an amplifier having inputs across which the sense resistor is coupled and an output at which a voltage representative of the input current is produced;
      a first resistor coupled to at least one of the inputs of the amplifier, wherein the first resistor is formed from a plurality of connected elementary first resistor units surrounding the plurality of connected elementary sense resistor units on at least two sides, wherein each of the plurality of connected elementary first resistor units comprises a plurality of parallel metal sheets electrically connected in series to one another by vias; and
      a second resistor coupled to at least one of the inputs of the amplifier;
   wherein a gain of the amplification circuit is based upon a resistance of the second resistor and a ratio of a resistance of the sense resistor to a resistance of the first resistor; and
   wherein the first resistor and the sense resistor are formed from same materials in a same substrate and arranged in a ratiometric relationship such that the first resistor and sense resistor change temperature substantially equally during operation and such that the first resistor and sense resistor vary substantially equally in resistance over temperature.

2. The current sensor of claim 1,
   wherein the vias electrically connecting the plurality of parallel metal sheets of the plurality of connected elementary sense resistor units in parallel are substantially lesser in resistance than the plurality of parallel metal sheets of the plurality of connected elementary sense resistor units but not negligible as compared to the resistance of the plurality of parallel metal sheets of the plurality of connected elementary sense resistor units; and
   wherein the vias electrically connecting the plurality of parallel metal sheets of the plurality of connected elementary first resistor units in series are substantially lesser in resistance than the plurality of parallel metal sheets of the plurality of connected elementary first resistor units but not negligible as compared to the resistance of the plurality of parallel metal sheets of the plurality of connected elementary first resistor units.

3. The current sensor of claim 1,
   wherein the vias electrically connecting the plurality of parallel metal sheets of the plurality of connected elementary sense resistor units in parallel are lesser in resistance than the plurality of parallel metal sheets of the plurality of connected elementary sense resistor units by at least 90%; and
   wherein the vias electrically connecting the plurality of parallel metal sheets of the plurality of connected elementary first resistor units in parallel are lesser in resistance than the plurality of parallel metal sheets of the plurality of connected elementary first resistor units by at least 90%.

4. The current sensor of claim 1, wherein the plurality of parallel metal sheets of the plurality of connected elementary sense resistor units have identical width, length, and thickness dimensions; wherein the plurality of parallel metal sheets of the plurality of connected elementary first resistor units have identical width, length, and thickness dimensions; and wherein the width, length, and thickness dimensions of the plurality of parallel metal sheets of the plurality of connected elementary sense resistor units are substantially equal to the width, length, and thickness dimensions of the plurality of parallel metal sheets of the plurality of connected elementary first resistor units.

5. The current sensor of claim 1,
   wherein the plurality of connected elementary sense resistor units are arranged to be laterally adjacent to and aligned with one another in the substrate;
   wherein each of the plurality of connected elementary sense resistor units is comprised of:
      a first metal sheet;
      a second metal sheet;
      a third metal sheet;
      first vias connecting a bottom face of the second metal sheet to a top face of the first metal sheet;
      second vias connecting a bottom face of the third metal sheet to a top face of the second metal sheet; and
      third vias connected to a top face of the third metal sheet; and
   further comprising terminals connected to the third vias of laterally adjacent ones of the plurality of connected elementary sense resistor units.

6. The current sensor of claim 5,
   wherein the plurality of connected elementary first resistor units are arranged to be laterally adjacent to and aligned with one another in the substrate;
   wherein each of the plurality of connected elementary first resistor units is comprised of:
      a first metal sheet;
      a second metal sheet divided into first and second spaced apart portions laying in a same plane;
      a third metal sheet divided into first and second spaced apart portions laying in a same plane;

first vias connecting a top face of the first metal sheet to bottom faces of the first and second portions of the second metal sheet;

second vias connecting top faces of the first and second portions of the second metal sheet to bottom faces of the first and second portions of the third metal sheet; and third vias connected to top faces of the first and second portions of the third metal sheet; and further comprising terminals connected to the third vias of laterally adjacent ones of the plurality of connected elementary first resistor units.

7. The current sensor of claim 5, wherein the plurality of connected elementary first resistor units are arranged to be laterally adjacent to and aligned with one another in the substrate;

wherein each of the plurality of connected elementary first resistor units is comprised of:
a first metal sheet;
a second metal sheet;
a third metal sheet;
first vias connecting a bottom face of the second metal sheet to a top face of the first metal sheet;
second vias connecting a bottom face of the third metal sheet to a top face of the second metal sheet; and
third vias connected to a top face of the third metal sheet; and further comprising terminals connected to the third vias of laterally adjacent ones of the plurality of connected elementary first resistor units.

8. The current sensor of claim 1, wherein each of the plurality of connected elementary sense resistor units are dimensionally identical to each of the plurality of connected elementary first resistor units, with the plurality of connected elementary first resistor units being greater in number.

9. The current sensor of claim 1, wherein the sense resistor is formed from a plurality of parallel connected elementary sense resistor units;

wherein the plurality of parallel connected elementary sense resistor units are arranged to be laterally adjacent to and aligned with one another in the substrate; and wherein each of the plurality of parallel connected elementary sense resistor units comprises a metal sheet and vias, with terminals connected to the vias of laterally adjacent ones of the plurality of parallel connected elementary sense resistor units.

10. The current sensor of claim 9, wherein the first resistor is formed from a plurality of series connected elementary first resistor units surrounding the plurality of parallel connected elementary sense resistor units on at least two sides;

wherein the plurality of series connected elementary first resistor units are arranged to be laterally adjacent to and aligned with one another in the substrate; and wherein each of the plurality of series connected elementary first resistor units comprises a metal sheet and vias connected to the metal sheet, with terminals connected to the vias of laterally adjacent ones of the plurality of series connected elementary first resistor units.

11. The current sensor of claim 10, wherein the metal sheets of the plurality of parallel connected elementary sense resistor units have a same length but greater width than metal sheets of the plurality of series connected elementary first resistor units.

12. The current sensor of claim 1, wherein the sense resistor is coupled between first and second nodes and receiving the input current from the power source; and wherein the amplification circuit comprises:
a chopper having inputs coupled to the first and second nodes and outputs coupled to third and fourth nodes;
a first current source coupled between the third node and a fifth node;
a second current source coupled between the fourth node and a sixth node;
the first resistor coupled between the fifth node and the sixth node;
a first p-channel transistor having a source coupled to the fifth node, a drain coupled to a seventh node, and a gate;
a third current source coupled between the seventh node and ground;
a second p-channel transistor having a source coupled to the sixth node, a drain coupled to an eighth node, and a gate;
a fourth current source coupled between the eighth node and ground;
a first PNP transistor having an emitter coupled to the third node, a base coupled to the fifth node, and a collector coupled to the gate of the first p-channel transistor;
a fifth current source coupled between the collector of the first PNP transistor and ground;
a second PNP transistor having an emitter coupled to the fourth node, a base coupled to the sixth node, and a collector coupled to the gate of the second p-channel transistor;
a sixth current source coupled between the collector of the second PNP transistor and ground;
the amplifier having a non-inverting input coupled to the eighth node, an inverting input coupled to the seventh node, a first output, and a second output;
a second resistor coupled between the non-inverting input and first output of the amplifier; and
a third resistor coupled between the inverting input and second output of the amplifier, the third resistor being a replica of the second resistor;
wherein the chopper is configured to auto-zero the amplification circuit during an initial phase, and is configured to subsequently alternate between: a) connecting the first node to the third node and connecting the second node to the fourth node, and b) connecting the second node to the third node and connecting the first node to the fourth node; and
wherein the amplifier is configured to auto-zero during the initial phase.

13. A current sensor, comprising:
a sense resistor coupled to receive an input current from a power source;
an amplification circuit having:
an amplifier having inputs across which the sense resistor is coupled and an output at which a voltage representative of the input is produced, wherein the sense resistor is formed from a plurality of connected elementary sense resistor units, wherein each of the plurality of connected elementary sense resistor units comprises a plurality of parallel metal sheets electrically connected in parallel to one another by vias;
a first resistor coupled to at least one of the inputs of the amplifier, wherein the first resistor is formed from a plurality of connected elementary first resistor units surrounding the plurality of connected elementary sense resistor units on at least two sides, wherein each of the plurality of connected elementary first resistor units comprises a plurality of parallel metal sheets electrically connected in series to one another by vias; and a second resistor coupled to at least one of the inputs of the amplifier;

wherein the first resistor and the sense resistor are formed from same materials in a same substrate and arranged in a ratiometric relationship.

14. The current sensor of claim 13, wherein the vias electrically connecting the plurality of parallel metal sheets of the plurality of connected elementary sense resistor units in parallel are substantially lesser in resistance than the plurality of parallel metal sheets of the plurality of connected elementary sense resistor units but not negligible as compared to the resistance of the plurality of parallel metal sheets of the plurality of connected elementary sense resistor units; and wherein the vias electrically connecting the plurality of parallel metal sheets of the plurality of connected elementary first resistor units in series are substantially lesser in resistance than the plurality of parallel metal sheets of the plurality of connected elementary first resistor units but not negligible as compared to the resistance of the plurality of parallel metal sheets of the plurality of connected elementary first resistor units.

15. The current sensor of claim 13, wherein the vias electrically connecting the plurality of parallel metal sheets of the plurality of connected elementary sense resistor units in parallel are lesser in resistance than the plurality of parallel metal sheets of the plurality of connected elementary sense resistor units by at least 90%; and wherein the vias electrically connecting the plurality of parallel metal sheets of the plurality of connected elementary first resistor units in parallel are lesser in resistance than the plurality of parallel metal sheets of the plurality of connected elementary first resistor units by at least 90%.

16. The current sensor of claim 13, wherein the plurality of parallel metal sheets of the plurality of connected elementary sense resistor units have identical width, length, and thickness dimensions; wherein the plurality of parallel metal sheets of the plurality of connected elementary first resistor units have identical width, length, and thickness dimensions; and wherein the width, length, and thickness dimensions of the plurality of parallel metal sheets of the plurality of connected elementary sense resistor units are substantially equal to the width, length, and thickness dimensions of the plurality of parallel metal sheets of the plurality of connected elementary first resistor units.

17. The current sensor of claim 13, wherein the plurality of connected elementary sense resistor units are arranged to be laterally adjacent to and aligned with one another in the substrate;

wherein each of the plurality of connected elementary sense resistor units is comprised of:
    a first metal sheet;
    a second metal sheet;
    a third metal sheet;
    first vias connecting a bottom face of the second metal sheet to a top face of the first metal sheet;
    second vias connecting a bottom face of the third metal sheet to a top face of the second metal sheet; and
    third vias connected to a top face of the third metal sheet; and further comprising terminals connected to the third vias of laterally adjacent ones of the plurality of connected elementary sense resistor units.

18. The current sensor of claim 13, wherein each of the plurality of connected elementary sense resistor units are dimensionally identical to each of the plurality of connected elementary first resistor units, with the plurality of connected elementary first resistor units being greater in number.

* * * * *

UNITED STATES PATENT AND TRADEMARK OFFICE
CERTIFICATE OF CORRECTION

| | |
|---|---|
| PATENT NO. | : 12,119,735 B2 |
| APPLICATION NO. | : 17/680666 |
| DATED | : October 15, 2024 |
| INVENTOR(S) | : Yannick Guedon et al. |

It is certified that error appears in the above-identified patent and that said Letters Patent is hereby corrected as shown below:

In the Specification

At Column 18, Line 20, please replace the term [[MN]] with -- NIN --.

At Column 21, Line 11, please replace the term [[MN]] with -- NIN --.

Signed and Sealed this
Nineteenth Day of November, 2024

Katherine Kelly Vidal
*Director of the United States Patent and Trademark Office*